(12) United States Patent
Wei

(10) Patent No.: US 11,115,591 B2
(45) Date of Patent: Sep. 7, 2021

(54) PHOTOGRAPHING METHOD AND MOBILE TERMINAL

(71) Applicant: VIVO MOBILE COMMUNICATION CO., LTD., Guangdong (CN)

(72) Inventor: Dong Wei, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/037,410

(22) Filed: Sep. 29, 2020

(65) Prior Publication Data

US 2021/0014415 A1 Jan. 14, 2021

Related U.S. Application Data

(63) Continuation of application No. PCT/CN2019/081459, filed on Apr. 4, 2019.

(30) Foreign Application Priority Data

Apr. 4, 2018 (CN) .......................... 201810295832.9

(51) Int. Cl.
*H04N 5/262* (2006.01)
*H04N 5/232* (2006.01)
(Continued)

(52) U.S. Cl.
CPC ....... *H04N 5/23229* (2013.01); *H04N 5/2258* (2013.01); *H04N 5/23216* (2013.01); *H04N 5/232935* (2018.08); *H04N 5/265* (2013.01)

(58) Field of Classification Search
CPC ......... H04N 5/23229; H04N 5/232935; H04N 5/2258; H04N 5/23216; H04N 5/265; H04N 5/272
(Continued)

(56) References Cited

U.S. PATENT DOCUMENTS 7,394,489 B2 * 7/2008 Yagi ....................... H04N 9/735
348/227.1
7,724,296 B2 * 5/2010 Lonn ......................... G06T 7/73
348/333.12
(Continued)

FOREIGN PATENT DOCUMENTS

CN 102420898 A 4/2012
CN 104423946 A 3/2015
(Continued)

OTHER PUBLICATIONS

CN Search Report in Application No. 201810295832.9 dated Nov. 19, 2018.
(Continued)

*Primary Examiner* — Usman A Khan
(74) *Attorney, Agent, or Firm* — Maschoff Brennan

(57) ABSTRACT

A photographing method and a mobile terminal are provided. The method includes: receiving a first input by a user when a current screen displays a photographing preview screen; in response to the first input, updating the photographing preview screen and displaying it as a first sub-preview-screen and a second sub-preview-screen; receiving a second input by the user; in response to the second input, controlling a first photographing identifier displayed on the first sub-preview-screen and a second photographing identifier displayed on the second sub-preview-screen to move; and when the first photographing identifier and the second photographing identifier overlap, controlling a front-facing camera and a rear-facing camera to capture a first image and a second image respectively, and displaying a composite image of the first image and the second image.

20 Claims, 15 Drawing Sheets

(51) Int. Cl.
    *H04N 5/225*     (2006.01)
    *H04N 5/265*     (2006.01)

(58) Field of Classification Search
    USPC .......................................................... 348/239
    See application file for complete search history.

(56) References Cited

U.S. PATENT DOCUMENTS

| | | | |
|---|---|---|---|
| 9,538,059 B2* | 1/2017 | Lim | H04N 5/247 |
| 10,686,990 B2* | 6/2020 | Jang | H04N 5/23293 |
| 2005/0036044 A1* | 2/2005 | Funakura | H04N 5/272 |
| | | | 348/239 |
| 2008/0239131 A1* | 10/2008 | Thorn | G06K 9/00248 |
| | | | 348/333.01 |
| 2011/0304726 A1 | 12/2011 | Zhang et al. | |
| 2012/0120186 A1* | 5/2012 | Diaz | H04N 5/77 |
| | | | 348/36 |
| 2012/0196649 A1* | 8/2012 | Havens | H04N 5/23229 |
| | | | 455/556.1 |
| 2012/0268552 A1* | 10/2012 | Choi | G09G 5/377 |
| | | | 348/14.07 |
| 2013/0235224 A1* | 9/2013 | Park | H04N 5/2621 |
| | | | 348/218.1 |
| 2014/0098883 A1 | 4/2014 | Hannuksela et al. | |
| 2014/0285476 A1 | 9/2014 | Cho et al. | |
| 2015/0077323 A1* | 3/2015 | Ramaswamy | G06F 3/0304 |
| | | | 345/156 |
| 2015/0201130 A1* | 7/2015 | Cho | H04N 5/232935 |
| | | | 348/333.05 |
| 2015/0213303 A1* | 7/2015 | Jain | H04N 9/735 |
| | | | 382/118 |
| 2017/0272659 A1* | 9/2017 | Kim | H04N 5/2258 |
| 2021/0014415 A1 | 1/2021 | Wei | |

FOREIGN PATENT DOCUMENTS

| | | |
|---|---|---|
| CN | 105100642 A | 11/2015 |
| CN | 106303229 A | 1/2017 |
| CN | 106998248 A | 8/2017 |
| CN | 107613196 A | 1/2018 |
| CN | 108234891 A | 6/2018 |
| EP | 2 779 620 A1 | 9/2014 |
| EP | 2 816 798 A2 | 12/2015 |
| EP | 2 998 851 A1 | 3/2016 |
| EP | 3 125 524 A1 | 2/2017 |
| EP | 3 226 537 A1 | 10/2017 |
| KR | 20160056582 A | 5/2016 |
| WO | 2017016069 A1 | 2/2017 |

OTHER PUBLICATIONS

Written Opinion and International Search Report in Application No. PCT/CN2019/081459 dated Oct. 15, 2020.
EP Search Report in Application No. 19780822.3 dated Apr. 6, 2021.
EP Search Report in Application No. 19780822.3 dated Jul. 20, 2021.

* cited by examiner

PHOTOGRAPHING METHOD AND MOBILE TERMINAL

CROSS-REFERENCE TO RELATED APPLICATIONS

This application is continuation application of PCT International Application No. PCT/CN2019/081459 filed on Apr. 4, 2019, which claims priority to Chinese Patent Application No. 201810295832.9, filed in China on Apr. 4, 2018, the disclosures of which are incorporated in their entireties by reference herein.

TECHNICAL FIELD

Embodiments of this disclosure relate to the field of communications technologies, and in particular, to a photographing method and a mobile terminal.

BACKGROUND

With rapid development of mobile terminals, the mobile terminals have become indispensable image processing tools of people. The mobile terminals can be used not only for image beautification but also for image synthesis. For example, when going outing and photographing a comparatively satisfactory scenic photo, a user may use a mobile phone to perform image synthesis on a user photo and the scenic photo.

In the prior art, when a user needs to obtain a composite image, the user first needs to photograph images and store the images in an album. Then the user uses image synthesis software to select two images that need to be synthesized from the album and synthesize the two images into one image. Consequently, operations are complicated.

SUMMARY

Embodiments of this disclosure provide a photographing method and a mobile terminal, to resolve a prior-art problem that operations in a process of generating a composite image are complicated.

To resolve the foregoing technical problem, this disclosure is implemented as follows:

According to a first aspect, an embodiment of this disclosure provides a photographing method, including:

receiving a first input by a user when a current screen displays a photographing preview screen;

in response to the first input, updating the photographing preview screen and displaying it as a first sub-preview-screen and a second sub-preview-screen;

receiving a second input by the user;

in response to the second input, controlling a first photographing identifier displayed on the first sub-preview-screen and a second photographing identifier displayed on the second sub-preview-screen to move; and when the first photographing identifier and the second photographing identifier have an overlapping region with a preset area, controlling the front-facing camera and the rear-facing camera to capture a first image and a second image respectively, and displaying a composite image of the first image and the second image, where the first sub-preview-screen displays a preview image captured by the front-facing camera, and the second sub-preview-screen displays a preview image captured by the rear-facing camera.

According to a second aspect, an embodiment of this disclosure further provides a mobile terminal, including:

a first receiving module, configured to receive a first input by a user when a current screen displays a photographing preview screen;

a first display module, configured to: in response to the first input received by the first receiving module, update the photographing preview screen and display it as a first sub-preview-screen and a second sub-preview-screen;

a second receiving module, configured to receive a second input by the user;

a first moving module, configured to: in response to the second input received by the second receiving module, control a first photographing identifier displayed on the first sub-preview-screen and a second photographing identifier displayed on the second sub-preview-screen to move; and a second display module, configured to: when the first photographing identifier and the second photographing identifier have an overlapping region with a preset area, control the front-facing camera and the rear-facing camera to capture a first image and a second image respectively, and display a composite image of the first image and the second image, where the first sub-preview-screen displays a preview image captured by the front-facing camera, and the second sub-preview-screen displays a preview image captured by the rear-facing camera.

According to a third aspect, an embodiment of this disclosure further provides a mobile terminal, including: a memory, a processor, and a computer program that is stored in the memory and is capable of running on the processor, where when the computer program is executed by the processor, steps of the foregoing photographing method are implemented.

According to a fourth aspect, an embodiment of this disclosure further provides a computer-readable storage medium. The computer-readable storage medium stores a computer program, and when the computer program is executed by a processor, steps of the foregoing photographing method are implemented.

In the embodiments of this disclosure, the first input by the user is received when the current screen displays the photographing preview screen; in response to the first input, the photographing preview screen is updated and displayed as the first sub-preview-screen and the second sub-preview-screen; the second input by the user is received; in response to the second input, the first photographing identifier displayed on the first sub-preview-screen and the second photographing identifier displayed on the second sub-preview-screen are controlled to move; and when the first photographing identifier and the second photographing identifier have the overlapping region with the preset area, the front-facing camera and the rear-facing camera are controlled to capture the first image and the second image respectively, and the composite image of the first image and the second image is displayed. The first sub-preview-screen displays the preview image captured by the front-facing camera, and the second sub-preview-screen displays the preview image captured by the rear-facing camera. In this way, the mobile terminal may control the front-facing camera and the rear-facing camera to simultaneously photograph images, and when two photographing identifiers on two sub-preview-screens have the overlapping region, control the two images photographed by the front-facing camera and the rear-facing camera to be synthesized into one image. Operations in the process of generating the composite image are simple.

DESCRIPTION OF EMBODIMENTS

The following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure.

Figure 1:
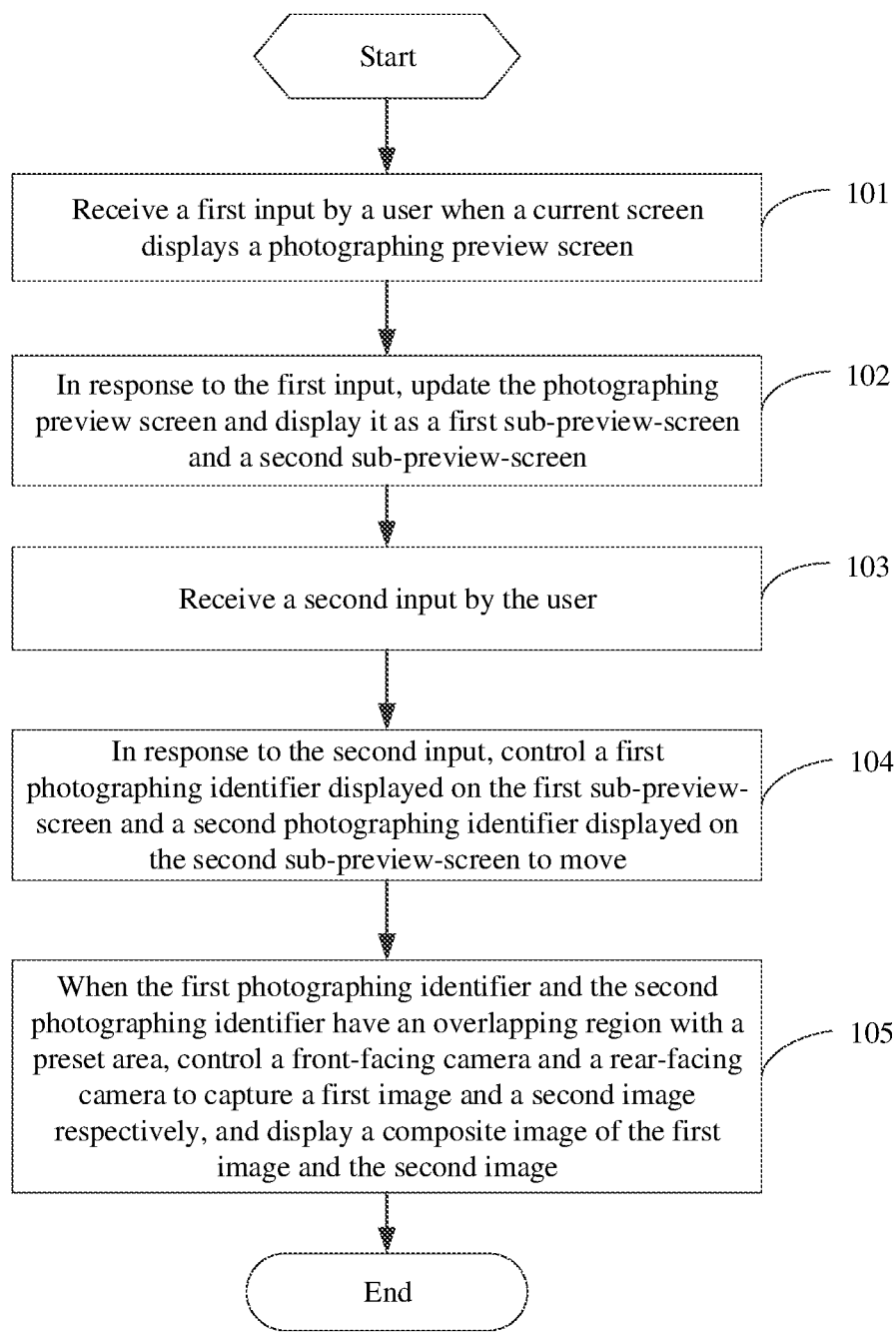
FIG. 1 is a first flowchart of a photographing method according to an embodiment of this disclosure.

FIG. 1 is a first flowchart of a photographing method according to an embodiment of this disclosure. As shown in FIG. 1, the method includes the following steps:

Step 101: Receive a first input by a user when a current screen displays a photographing preview screen.

The photographing preview screen may be a screen displayed when a mobile terminal is in a photographing preview state during photographing. In this case, the photographing preview screen displays a preview image. The user may perform the first input on the photographing preview screen. The first input may be specifically an input triggered by performing a sliding operation on a display screen or by folding the mobile terminal.

Step 102: In response to the first input, update the photographing preview screen and display it as a first sub-preview-screen and a second sub-preview-screen, where the first sub-preview-screen displays a preview image captured by a front-facing camera, and the second sub-preview-screen displays a preview image captured by a rear-facing camera.

In this step, the first sub-preview-screen and the second sub-preview-screen are two independent preview screens. The mobile terminal divides the original photographing preview screen into two sub-preview-screens, and displays both the sub-preview-screens.

The first sub-preview-screen and the second sub-preview-screen may be two preview screens of a same size or different sizes, and may be two sub-preview-screens horizontally or vertically divided. The division size and the division manner of sub-preview-screens may be determined according to the user's input manner.

Specifically, when the first input is a sliding operation performed by the user on the photographing preview screen, the sliding trajectory of the first input is obtained; and when the sliding trajectory satisfies a preset condition, the photographing preview screen is updated and displayed as the first sub-preview-screen and the second sub-preview-screen with a straight line on which the sliding trajectory is located as a dividing line.

In this implementation, the user may perform the sliding operation on the photographing preview screen, and the mobile terminal may obtain the sliding trajectory of the sliding operation, and determine whether the sliding trajectory satisfies the preset condition for dividing the photographing preview screen into sub-preview-screens. The preset condition may be a preset condition and stored by the mobile terminal. The condition may be specifically that the sliding trajectory is a straight line, the length of the sliding trajectory is greater than a preset length, or the like.

When the sliding trajectory satisfies the preset condition, the mobile terminal obtains the straight line on which the sliding trajectory is located. In a specific implementation, the straight line on which the sliding trajectory is located may be determined according to distribution locations of points on the sliding trajectory. The straight line is the dividing line between the first sub-preview-screen and the second sub-preview-screen.

Figure 2:
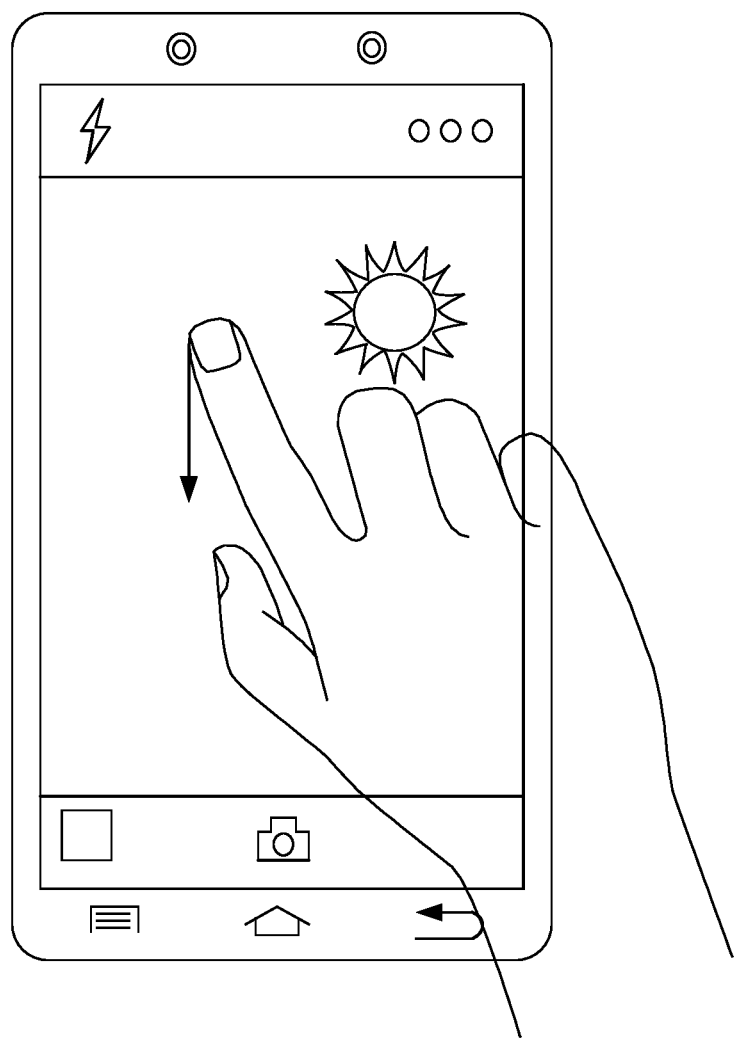
FIG. 2 is a first diagram of a display screen of a mobile terminal according to an embodiment of this disclosure.
Figure 3:
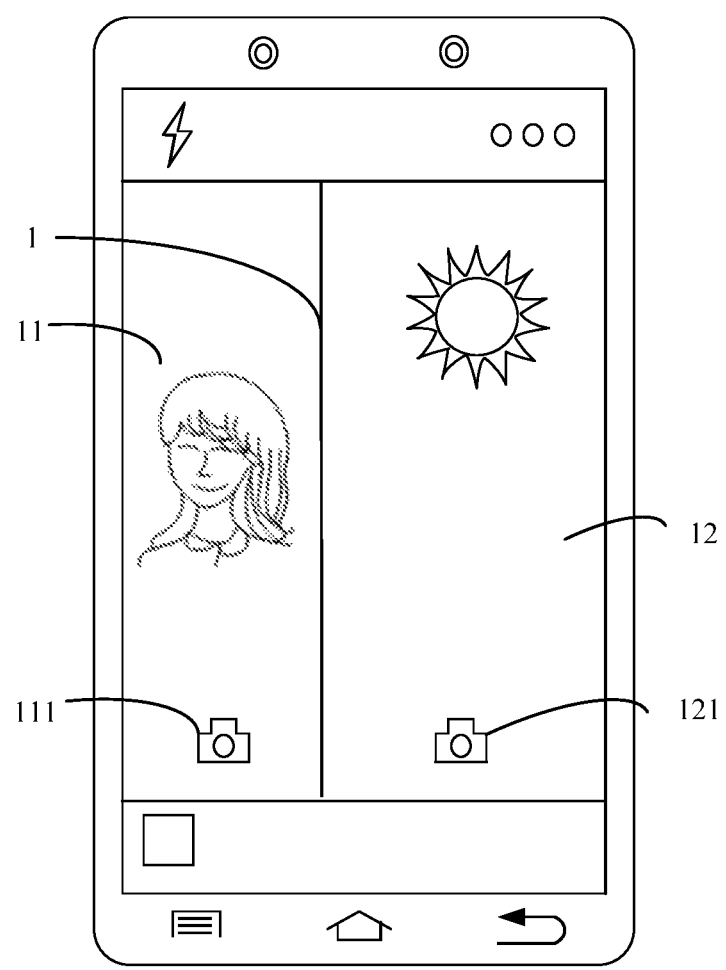
FIG. 3 is a second diagram of a display screen of a mobile terminal according to an embodiment of this disclosure.

For example, as shown in FIG. 2, when the mobile terminal displays the photographing preview screen, the user performs sliding on the photographing preview screen from the top down. As shown in FIG. 3, the mobile terminal obtains the sliding trajectory, determines the straight line 1 on which the sliding trajectory is located, and divides the photographing preview screen into a first sub-preview-screen 11 and a second sub-preview-screen 12 by the straight line 1 as the dividing line. The preview image on the first sub-preview-screen 11 is the image captured by the front-facing camera, and the preview image on the second sub-preview-screen 12 is the image captured by the rear-facing camera.

In this way, by performing an operation on the photographing preview screen, the user may trigger the mobile terminal to enter a mode in which both the front-facing camera and the rear-facing camera are used for preview, and control the mobile terminal to perform photographing by using both the front-facing camera and the rear-facing camera, so that a user operation is convenient. According to the user's sliding trajectory, the location of the dividing line between the first and second sub-preview-screens can be determined. In addition, according to the size of the photographed object, the user can control the division location of the photographing screen, so that an operation manner is flexible.

Specifically, the when the sliding trajectory satisfies a preset condition, updating the photographing preview screen and displaying it as the first sub-preview-screen and the second sub-preview-screen with a straight line on which the sliding trajectory is located as a dividing line includes: obtaining N target points on the sliding trajectory; obtaining the coordinate value of each target point in a preset coordinate system, and calculating the variance of coordinate values of the N target points; and when the variance is less than a preset threshold and the length of the sliding trajectory is greater than a preset length, updating the photographing preview screen and displaying it as the first sub-preview-screen and the second sub-preview-screen with the straight line on which the sliding trajectory is located as the dividing line, where the coordinate value of each target point is a coordinate value of the target point in an X direction or a Y direction of the preset coordinate system, and N is an integer greater than 1.

The N target points may be characteristic points on the sliding trajectory. For example, N target points with equal spacings are obtained from the sliding trajectory. The preset coordinate system may be a coordinate system preset by the mobile terminal, for example, a coordinate system formed by using a short-side direction of the mobile terminal as the X direction and using a long-side direction of the mobile terminal as the Y direction. The mobile terminal may obtain the coordinate value of each target point in the X direction or the Y direction of the coordinate system, and calculate the variance of N coordinate values.

For ease of understanding, an example in which the coordinate value of each target point in the X direction or the Y direction of the coordinate system is calculated is used for description with reference to the accompanying drawings.

Figure 4:
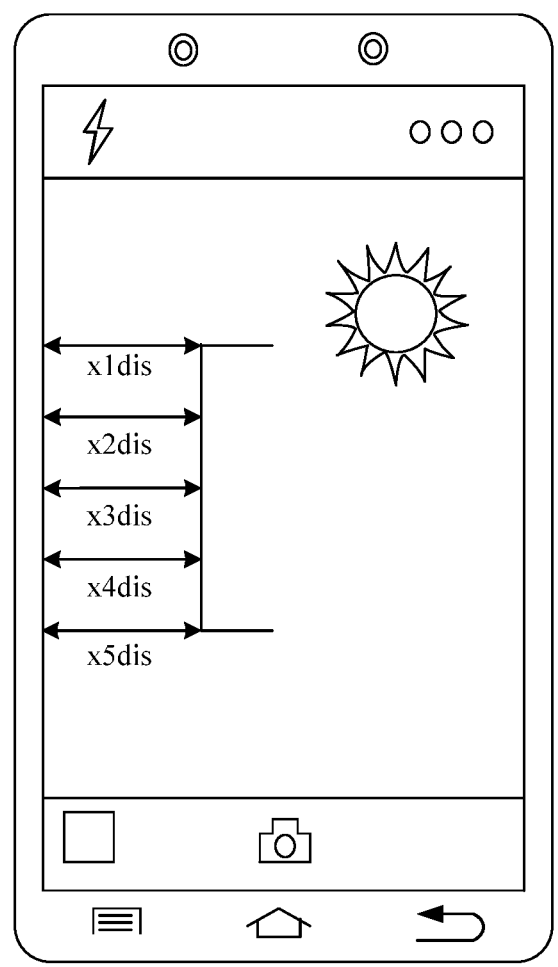
FIG. 4 is a third diagram of a display screen of a mobile terminal according to an embodiment of this disclosure.

As shown in FIG. 4, the mobile terminal obtains N coordinate values of N target points in the X direction, and the N coordinate values are x1dis, x2dis, . . . , and xndis. In this case, an average coordinate value xdis of the N target points is expressed as follows:

$$xdis = \frac{x1dis + x2dis + \ldots + xndis}{N}$$

Assuming that the variance of the coordinate values of the N target points is d, d may be expressed as follows:

$$d = \frac{(x1dis - xdis)^2 + (x2dis - xdis)^2 + \ldots + (xndis - xdis)^2}{N}$$

The variance d of the N coordinate values corresponding to the N target points may be calculated according to the foregoing calculation formula, and it may be determined whether the variance d is less than the preset threshold. If the variance is less than the preset threshold, it indicates that coordinate values of a plurality of target points in the X direction or the Y direction are close, that is, the sliding trajectory is a straight line. It may be further determined whether the length of the sliding trajectory is greater than the preset length. When the length of the sliding trajectory is greater than the preset length, the photographing preview screen is updated and displayed as the two sub-preview-screens. This can prevent a mis-operation by the user due to a mis-touch, thereby improving effectiveness of the user operation.

Optionally, after the when the sliding trajectory satisfies a preset condition, updating the photographing preview screen and displaying it as the first sub-preview-screen and the second sub-preview-screen with a straight line on which the sliding trajectory is located as a dividing line and before the receiving a second input by the user, the method further includes: receiving a third input that the user drags the dividing line; and in response to the third input, controlling the dividing line to move according to the dragging direction and the dragging distance of the third input.

The third input may be a dragging operation performed by the user on the dividing line. The user may drag the dividing line to the left or right, or may drag the dividing line up or down. The mobile terminal controls the dividing line to move according to the dragging direction and the dragging distance of the third input. For example, when the user drags the dividing line to the right by 1 centimeter, the dividing line moves to the right by 1 centimeter. In this way, the user can adjust sizes of the first sub-preview-screen and the second sub-preview-screen by dragging the dividing line, so that an operation is convenient.

Before this step, the mobile terminal may preset a correspondence between a dragging direction and a moving direction of a dividing line. In a specific implementation, a correspondence between a range of a dragging direction and a moving direction of a dividing line may be set. For example, it is specified that a dragging direction being a direct right direction and a direction deviating by an angle within 20° corresponds to the dividing line moving to the right. This facilities a quick operation by the user and reduces the user's operation error.

When the dividing line moves, the sizes of the first sub-preview-screen and the second sub-preview-screen change as the dividing line moves. In this way, the user may change the sizes of the two sub-preview screens according to the actual photographing scenario, so as to achieve better photographing effect.

When the mobile terminal is a mobile terminal with a flexible screen and the first input is an operation of bending the flexible screen by the user, the updating the photographing preview screen and displaying it as a first sub-preview-screen and a second sub-preview-screen includes: obtaining a bending angle of the flexible screen; when the bending angle is greater than a preset angle, obtaining the kink mark formed by the first input on the flexible screen; and when the direction of the kink mark is a preset direction, updating the photographing preview screen and displaying it as the first sub-preview-screen and the second sub-preview-screen with a straight line on which the kink mark is located as a dividing line.

In this implementation, when the mobile terminal is a mobile terminal with a flexible screen, the user may bend the flexible screen of the mobile terminal, and the mobile terminal receives the first input that the user bends the flexible screen. In this case, the flexible screen forms a specific bending angle, and the kink mark is formed between two parts of the flexible screen that form the angle.

The preset angle may be an angle preset by the mobile terminal. When the bending angle of the flexible screen of the mobile terminal is greater than the preset angle, the mobile terminal obtains the kink mark. When the direction of the kink mark is the preset direction, the mobile terminal updates the photographing preview screen and displays it as the first sub-preview-screen and the second sub-preview-screen along the straight line on which the kink mark is located.

Figure 5:
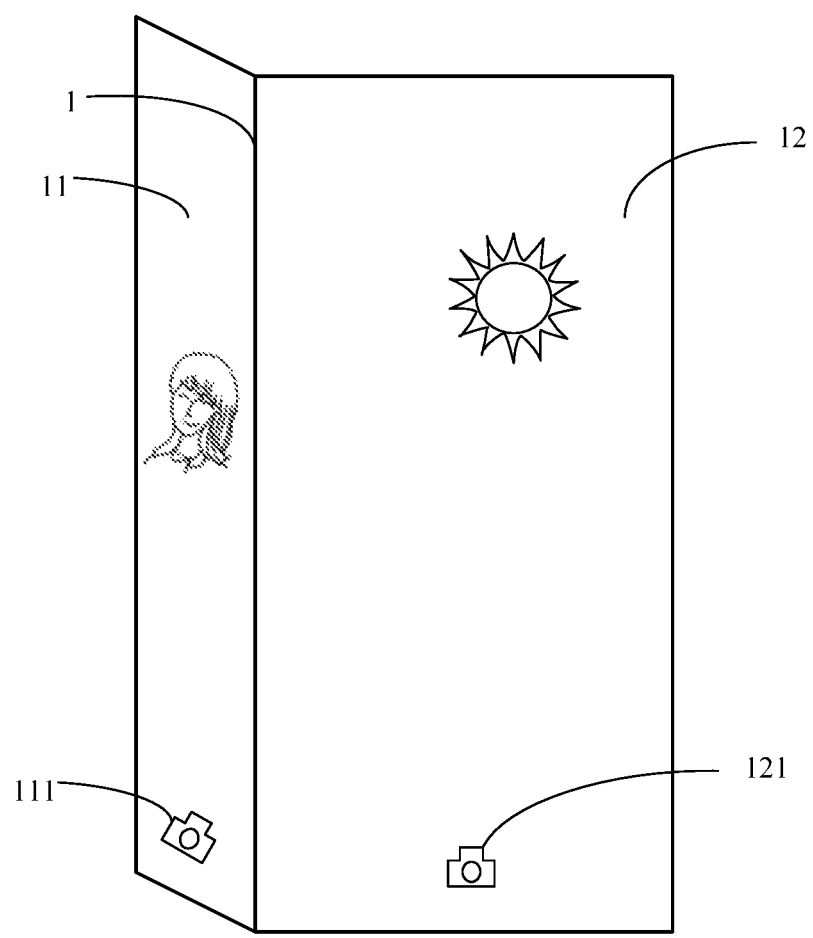
FIG. 5 is a fourth diagram of a display screen of a mobile terminal according to an embodiment of this disclosure.

For example, as shown in FIG. 5, when the mobile terminal displays the photographing preview screen, the flexible screen of the mobile terminal is bent vertically. A straight line 1 on which a bending kink mark is located divides the photographing preview screen into a first sub-preview-screen 11 and a second sub-preview-screen 12 that are in a vertical direction.

In this way, the user can quickly divide the photographing preview screen into the two sub-preview-screens by bending the flexible screen. A user operation is convenient.

Optionally, after the when the direction of the kink mark is a preset direction, updating the photographing preview screen and displaying it as the first sub-preview-screen and the second sub-preview-screen with a straight line on which the kink mark is located as a dividing line, the method further includes: receiving a fourth input that the user bends the flexible screen; and in response to the fourth input, controlling the dividing line to move according to a bending direction of the fourth input, where the moving of the location of the dividing line corresponds to the size adjustment of screen areas of the first sub-preview-screen and the second sub-preview-screen, a first bending direction of the fourth input corresponds to a first moving direction of the dividing line, and a second bending direction of the fourth input corresponds to a second moving direction of the dividing line.

After the photographing preview screen is updated and displayed as the two sub-preview-screens, the user may continue to bend the flexible screen. The first bending direction and the second bending direction may be understood as directions in which the bending part of the flexible screen rotates around the kink mark, for example, clockwise bending and anticlockwise bending. The mobile terminal may preset a correspondence between a bending direction and a moving direction of a dividing line. For example, when a bending direction is a clockwise direction, the corresponding dividing line moves to the right. When the user bends the flexible screen, the mobile terminal obtains a preset moving direction corresponding to a bending direction, and moves the dividing line. When the dividing line moves, the sizes of the first sub-preview-screen and the second sub-preview-screen change with a location of the dividing line.

Figure 6:
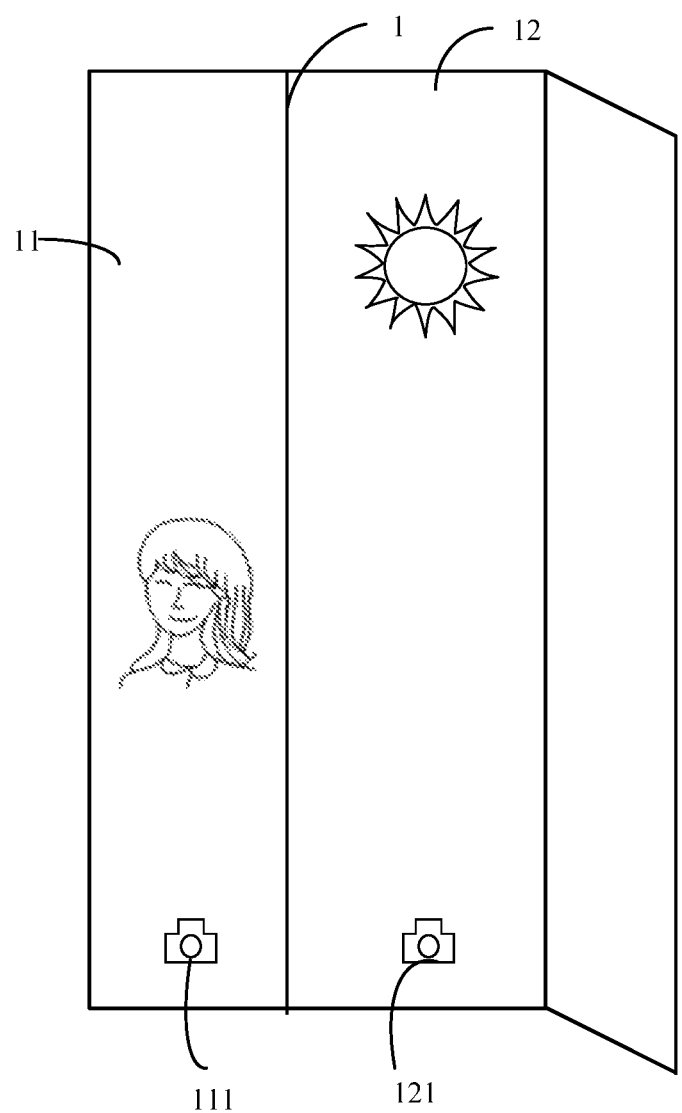
FIG. 6 is a fifth diagram of a display screen of a mobile terminal according to an embodiment of this disclosure.

For example, as shown in FIG. 6, a dividing line 1 divides the photographing preview screen into a first sub-preview-screen 11 and a second sub-preview-screen 12. When the user rotates the flexible screen clockwise, the mobile terminal moves the dividing line 1 to the left according to a bending direction.

In this way, the user may control the moving of the dividing line by bending the flexible screen. When the dividing line moves, the sizes of the first sub-preview-screen and the second sub-preview-screen change as the dividing line moves. In this way, the user may change the sizes of the two sub-preview-screens according to an actual photographing scenario, to achieve a better photographing effect.

Step 103: Receive a second input by the user.

The second input may be a pressing input, a tapping input, a sliding input, or the like that is on the photographing preview screen by the user.

Step 104: In response to the second input, control a first photographing identifier displayed on the first sub-preview-screen and a second photographing identifier displayed on the second sub-preview-screen to move.

In this step, in response to the second input, the mobile terminal controls the first photographing identifier and the second photographing identifier to simultaneously move toward each other, or controls the first photographing identifier to move towards the second photographing identifier, or controls the second photographing identifier to move towards the first photographing identifier, until the two photographing identifiers overlap or coincide.

Figure 7:
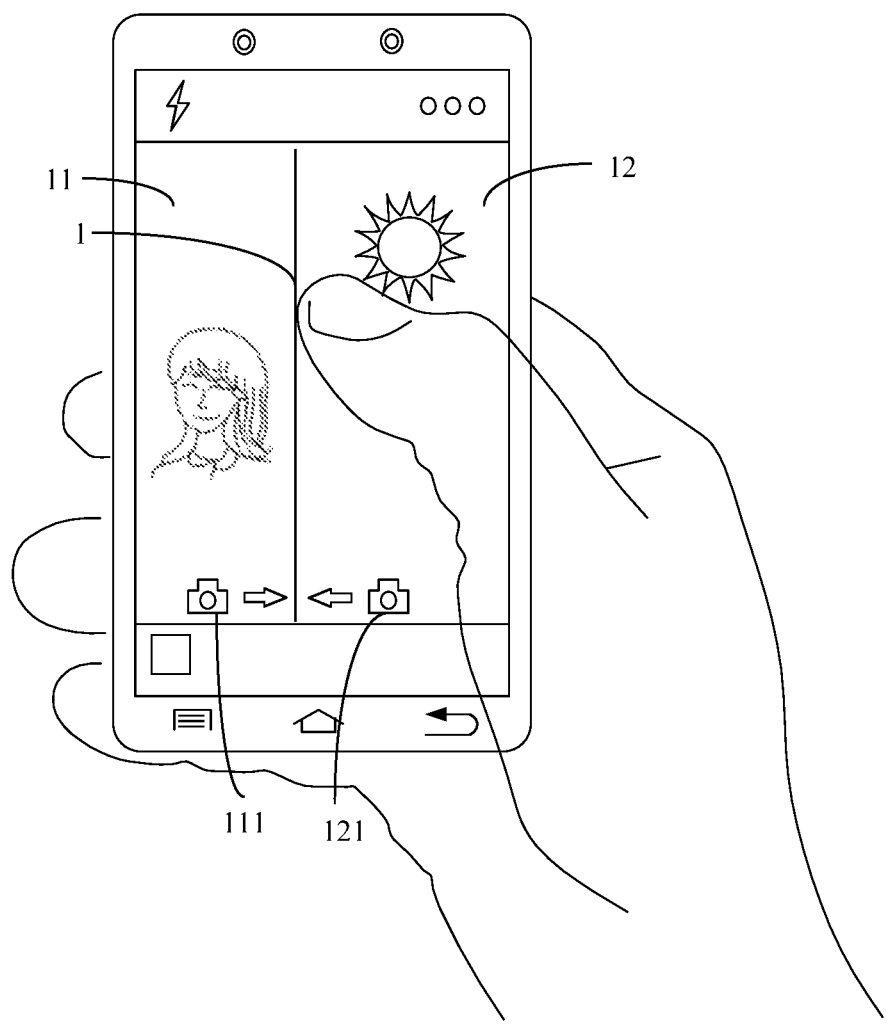
FIG. 7 is a sixth diagram of a display screen of a mobile terminal according to an embodiment of this disclosure.
Figure 8:
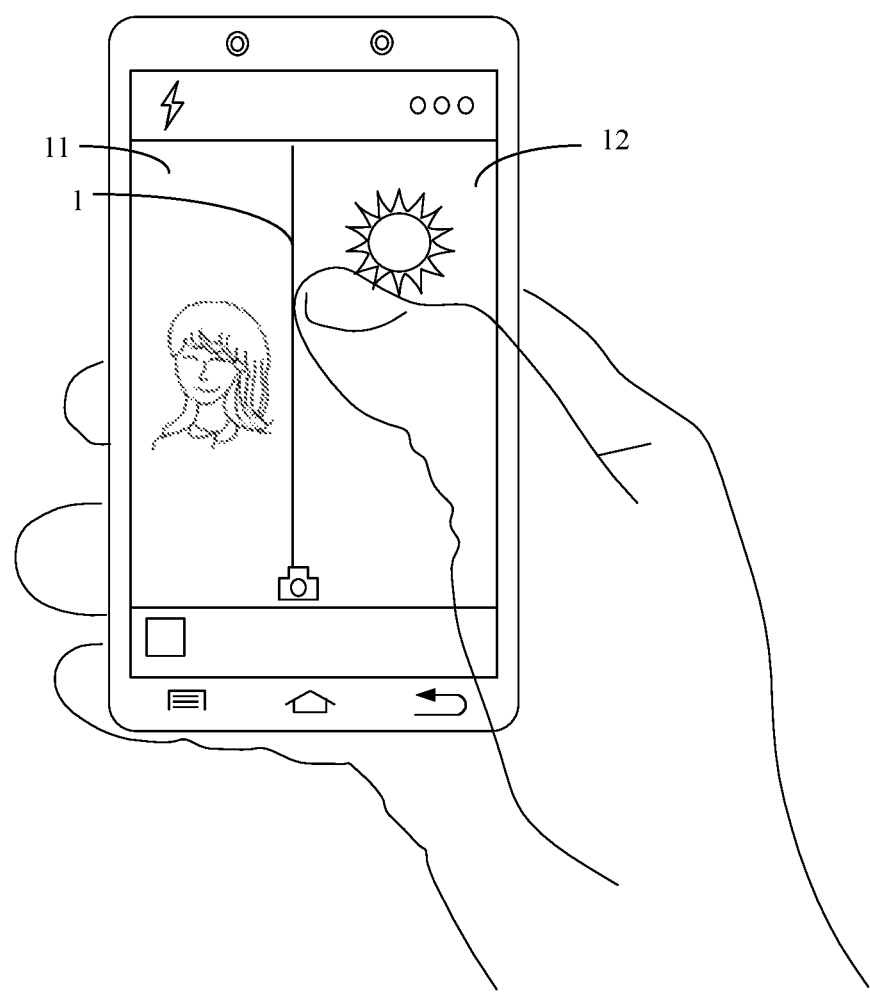
FIG. 8 is a seventh diagram of a display screen of a mobile terminal according to an embodiment of this disclosure.

For example, as shown in FIG. 7, the user presses on the photographing preview screen of the mobile terminal, and the mobile terminal controls a first photographing identifier 111 and a second photographing identifier 121 to move toward each other. The two photographing identifiers gradually approach each other or even overlap. The mobile terminal displays a screen shown in FIG. 8.

Figure 9:
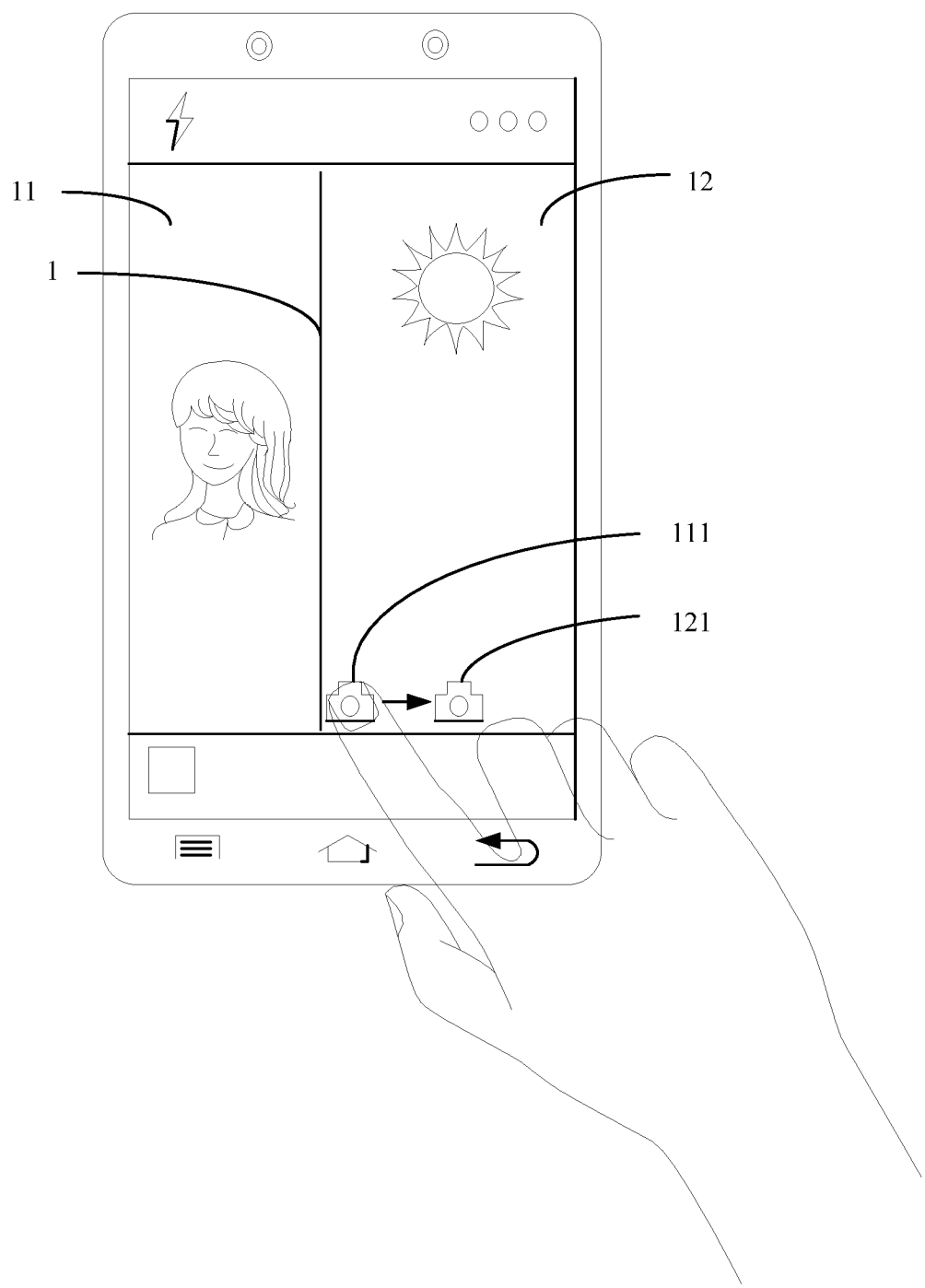
FIG. 9 is an eighth diagram of a display screen of a mobile terminal according to an embodiment of this disclosure.

For another example, as shown in FIG. 9, the user slides a first photographing identifier 111, and the first photographing identifier 111 moves according to the user operation, and gradually approaches a second photographing identifier 121, until the two photographing identifiers overlap. The mobile terminal displays a screen shown in FIG. 8.

Step 105: When the first photographing identifier and the second photographing identifier have an overlapping region with a preset area, control the front-facing camera and the rear-facing camera to capture a first image and a second image respectively, and display a composite image of the first image and the second image.

In this step, the first image is generated from the preview image on the first sub-preview-screen, the second image is generated from the preview image on the second sub-preview-screen, and the first image and the second image are synthesized into one image.

In a specific implementation, the mobile terminal may detect whether the first image includes a first target image that with a preset characteristic. The preset characteristic may be a characteristic preset by the mobile terminal. For example, if the preset characteristic is a characteristic of having eyes, a nose, and a mouth, the first target image may be an animal. When the first image includes the first target image, the first target image and the second image are synthesized.

In this way, by performing an operation on the photographing preview screen, the user may trigger the mobile terminal to synthesize images photographed on the two sub-preview-screens, and synthesize the first image and the second target image that has the preset characteristic and that is in the first image, so that an image synthesis effect can be improved.

Further, when the first photographing identifier and the second photographing identifier have the overlapping region with the preset area, the front-facing camera and the rear-facing camera are controlled to capture a first image and a second image respectively; and when the first image includes a face image, a composite image of the face image and the second image is displayed.

In this implementation, the mobile terminal may further determine whether the first image includes a face image. Specifically, the mobile terminal may perform the determining according to the characteristic of the face. When the first image includes the face image, the face image is extracted from the first image, and image synthesis is performed on the extracted face image and the second image. The image other than the face image that in the first image is not synthesized. In a specific implementation, the second image may be used as the background, and the face image is placed at an upper image layer of the second image. This can obtain a composite image that includes the face image.

For example, the first image is the user's selfie, and the second image is a landscape photo. The mobile terminal automatically extracts the user's face image from the first image, and performs image synthesis on the face image and the landscape photo, to obtain a landscape photo that includes the user's face image. The user does not need to perform an editing operation of extracting the user's face image from the first image.

In this way, the user can take photos with other scenery without the assistance of other people, and the user may view a selfie by using the front-facing camera, thereby achieving a comparatively good photographing effect.

Further, the when the first image includes a face image, displaying a composite image of the face image and the second image includes: when the first image includes the face image, displaying the face image at a preset location on the second image; receiving a fifth input that the user drags the face image; in response to the fifth input, moving the face image; and displaying the composite image of the face image and the second image, where the face image is at a dragging end location of the fifth input.

In this implementation, after extracting the face image from the first image, the mobile terminal may display the face image at the preset location on the second image, for example, a middle location or a lower location on a display screen. The user may move the location of the face image to achieve a better synthesis effect. The fifth input is a dragging operation of dragging the face image by the user. The mobile terminal moves the face image according to a dragging trajectory of the dragging operation. When the user's finger leaves the screen, the dragging operation ends. The location of the user's finger on the screen when the dragging operation ends may be understood as the end location of the dragging input. The mobile terminal may obtain the end location of the dragging input, move the face image to the end location of the dragging input, and then synthesize the moved face image and the second image into one image. For example, the dragging operation ends when the user drags the face image from a location A to a location B. In this case, the location B is the dragging end location.

Figure 10:
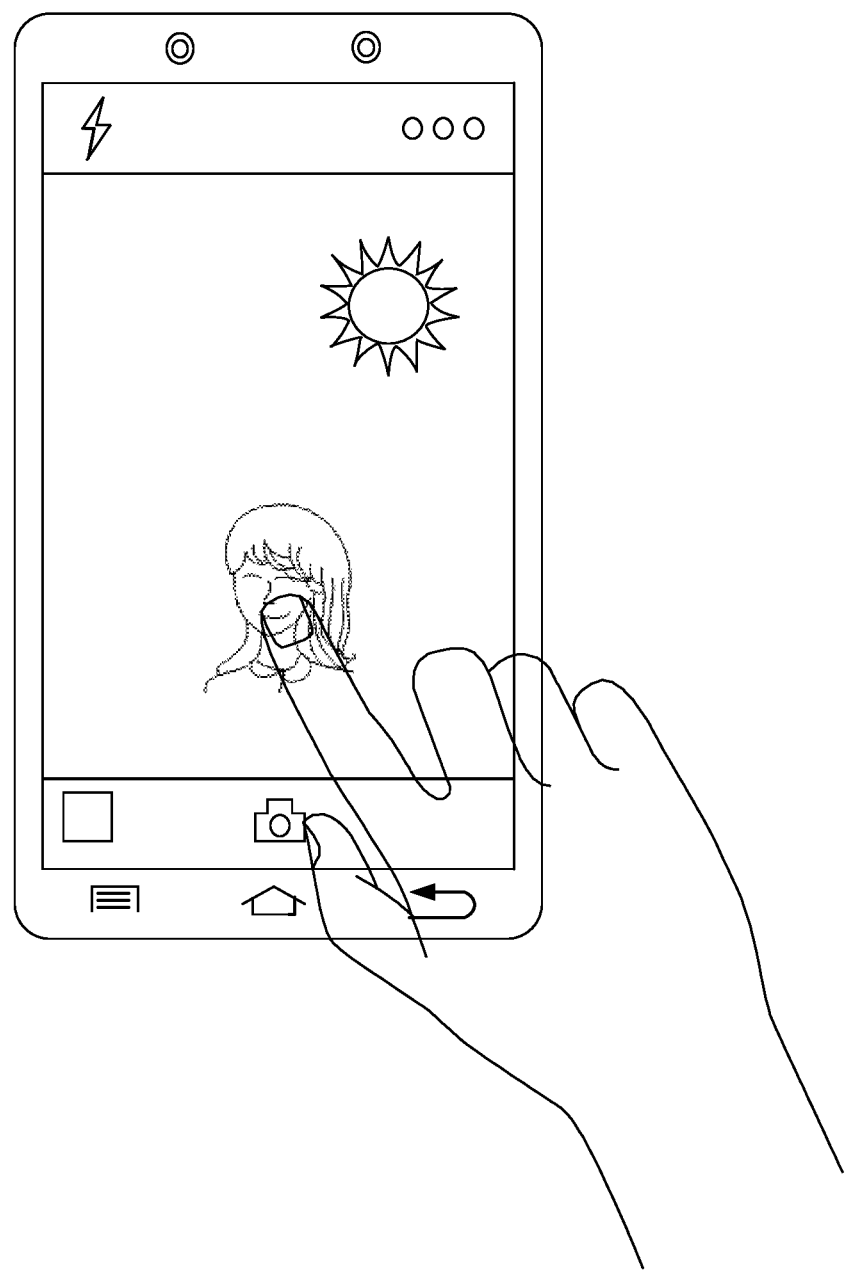
FIG. 10 is a ninth diagram of a display screen of a mobile terminal according to an embodiment of this disclosure.

For example, as shown in FIG. 10, the user may drag the face image to any location on a display screen, to obtain a better composite image.

In a specific implementation, a size adjustment box may be further generated on the face image. The user may adjust the size of the face image to obtain a better composite image.

In this implementation, the location of a face may be adjusted. The user may perform an operation on the face image to move the location of the face image, so that a user operation is simple, and a better composite image effect can be achieved.

Optionally, before the displaying a composite image of the first image and the second image, the method further includes: displaying a first image edit box and a second image edit box, where the first image is displayed in the first image edit box, and the second image is displayed in the second image edit box; receiving a sixth input by the user on the first image edit box or the second image edit box; and in response to the sixth input, adjusting the size of the first image edit box or the second image edit box, where the first image edit box is used to adjust the size of the first image, and the second image edit box is used to adjust the size of the second image.

The first image edit box may be an operation box that is used to edit the first image. The mobile terminal may display the first image edit box at an edge of the first image, so that the first image is displayed in the first image edit box. The user can adjust the size of the first image edit box by performing an operation on the first image edit box. When the size of the first image edit box changes, the first image changes as the size of the first image edit box changes. The sixth input may be an operation such as sliding or pressing performed by the user on the first image edit box or the second image edit box. By displaying the first image edit box and the second image edit box, the user may separately adjust the size of the first image or the second image.

For example, the first image edit box is displayed at an edge of the first image, and the user simultaneously performs sliding operations that are toward each other at different locations on the first image edit box with two fingers. The first image edit box becomes smaller, and the first image becomes smaller accordingly.

In a specific implementation, the user may further perform an operation on the first image edit box to rotate the first image edit box, so as to control the rotation of the first image.

In addition, the mobile terminal may display the first image edit box in any area on the first image. The user may move the location of the first image edit box on the first image, and may adjust the size of the first image edit box, to capture a part of the first image that is in the first image edit box.

The second image edit box may be a box used to edit the second image. The mobile terminal may display the second image edit box at an edge of the second image, so that the second image is displayed in the second image edit box. The user may also perform an operation on the second image edit box to adjust the size of the second image edit box, so as to adjust the size of the second image. The specific adjustment manner may be the same as the operation on the first image edit box. Details are not described herein again.

The user may adjust the size of the first image or the second image according to the size of the first image and the size of the second image, so that the size of the first image adapts to the size of the second image, to achieve a better image synthesis effect.

Optionally, after the displaying a composite image of the first image and the second image, the method further includes: displaying a third image edit box, where the composite image is displayed in the third image edit box; receiving a seventh input on the third image edit box by the user; and in response to the seventh input, adjusting the size of the third image edit box, where the third image edit box is used to adjust a size of the composite image.

The third image edit box includes the composite image of the first image and the second image. Specifically, the third image edit box includes all or part of the composite image. The seventh input may be an operation such as sliding or pressing performed on the third image edit box by the user. The mobile terminal adjusts the size of the third image edit box, to adjust the size of the composite image.

In a specific implementation, the third image edit box may be displayed at an edge of the composite image, and all content of the composite image is displayed in the third image edit box. In this case, the user may perform an operation on the third image edit box to adjust the size of the third image edit box. In this way, when the size of the third image edit box is adjusted, the size of the composite image changes as the size of the third image edit box changes.

Figure 11:
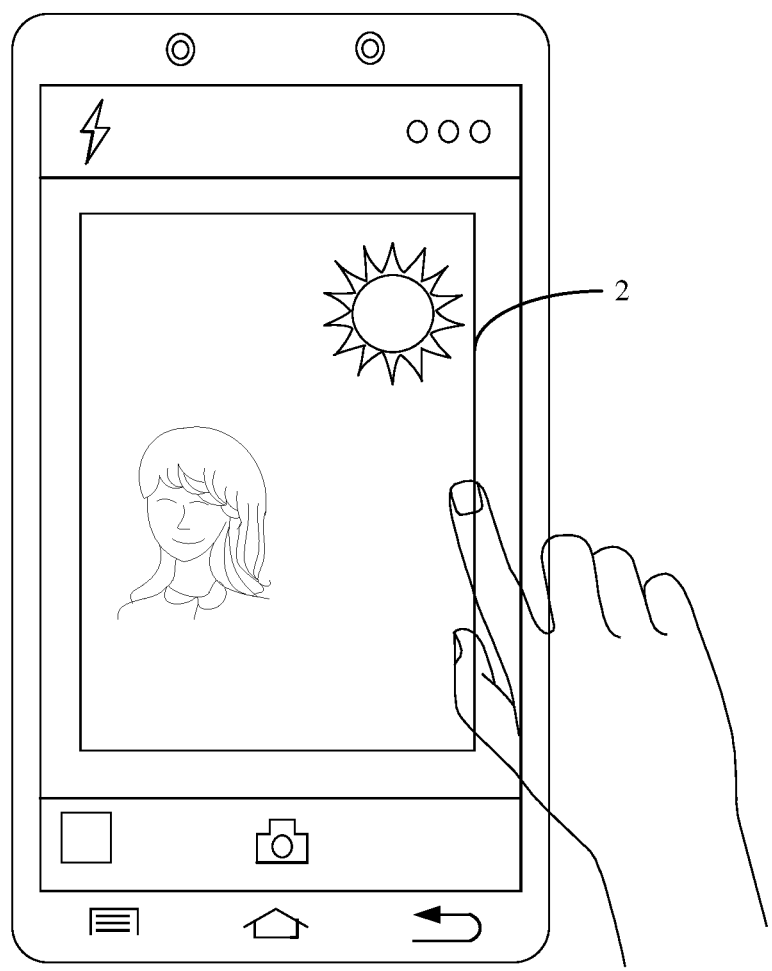
FIG. 11 is a tenth diagram of a display screen of a mobile terminal according to an embodiment of this disclosure.

For example, as shown in FIG. 11, the mobile terminal displays an image edit box 2 on a screen, and the image edit box 2 includes the composite image. The user performs a sliding operation that are toward each other at different locations on the third image edit box with two fingers. The third image edit box becomes smaller, and the composite image becomes smaller accordingly. When the user's two fingers slide back against each other, the third image edit box becomes larger, and the composite image becomes larger accordingly.

In this way, the mobile terminal can quickly adjust the size of the composite image by performing an operation on the third image edit box, to achieve a better image effect.

In addition, the mobile terminal may display the third image edit box at any location on the composite image. The user may perform an operation on the third image edit box to adjust the size and the location of the third image edit box. When the adjustment on the third image edit box ends, the mobile terminal may capture an image in the third image edit box to achieve a better image effect.

For example, as shown in FIG. 11, the mobile terminal displays an image edit box 2 on the composite image, and the user may move the image edit box 2, and may adjust the size of the image edit box 2. After determining the size and the location of the image edit box 2, the user may performing a pressing input on the image edit box 2. The mobile terminal obtains the composite image in the image edit box 2, and captures an image in the image edit box 2.

In this way, the user may obtain only part of the image that needs to be synthesized, and remove a part that is not suitable for image synthesis, to achieve a better image effect.

For ease of understanding this solution, the following describes examples of specific embodiments of this disclosure with reference to flowcharts.

Figure 12:
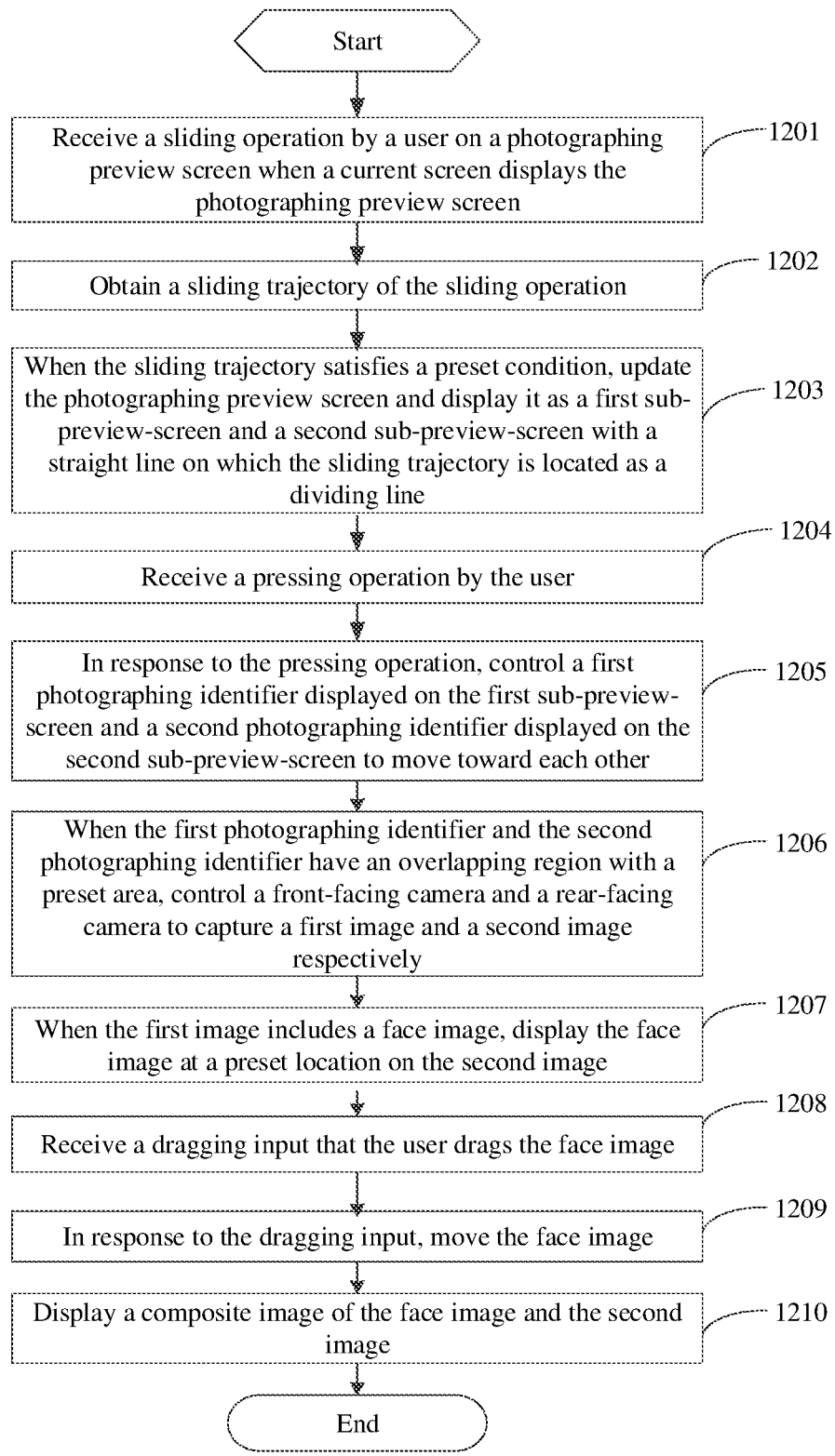
FIG. 12 is a second flowchart of a photographing method according to an embodiment of this disclosure.

As shown in FIG. 12, a photographing method includes the following steps.

Step 1201: Receive a sliding operation by a user on a photographing preview screen when the current screen displays the photographing preview screen.

Step 1202: Obtain the sliding trajectory of the sliding operation.

Step 1203: When the sliding trajectory satisfies a preset condition, update the photographing preview screen and display it as a first sub-preview-screen and a second sub-preview-screen with a straight line on which the sliding trajectory is located as a dividing line, where the first sub-preview-screen displays a preview image captured by a front-facing camera, and the second sub-preview-screen displays a preview image captured by a rear-facing camera.

Step 1204: Receive a pressing operation by the user.

Step 1205: In response to the pressing operation, control a first photographing identifier displayed on the first sub-preview-screen and a second photographing identifier displayed on the second sub-preview-screen to move toward each other.

Step 1206: When the first photographing identifier and the second photographing identifier have an overlapping region with a preset area, control the front-facing camera and the rear-facing camera to capture a first image and a second image respectively.

Step 1207: When the first image includes a face image, display the face image at a preset location on the second image.

Step 1208: Receive a dragging input that the user drags the face image.

Step 1209: In response to the dragging input, move the face image.

Step 1210: Display a composite image of the face image and the second image, where the face image is at a dragging end location of the dragging input.

For specific implementations of step 1201 to step 1210, refer to the descriptions in step 101 to step 105. Details are not described herein again.

Figure 13:
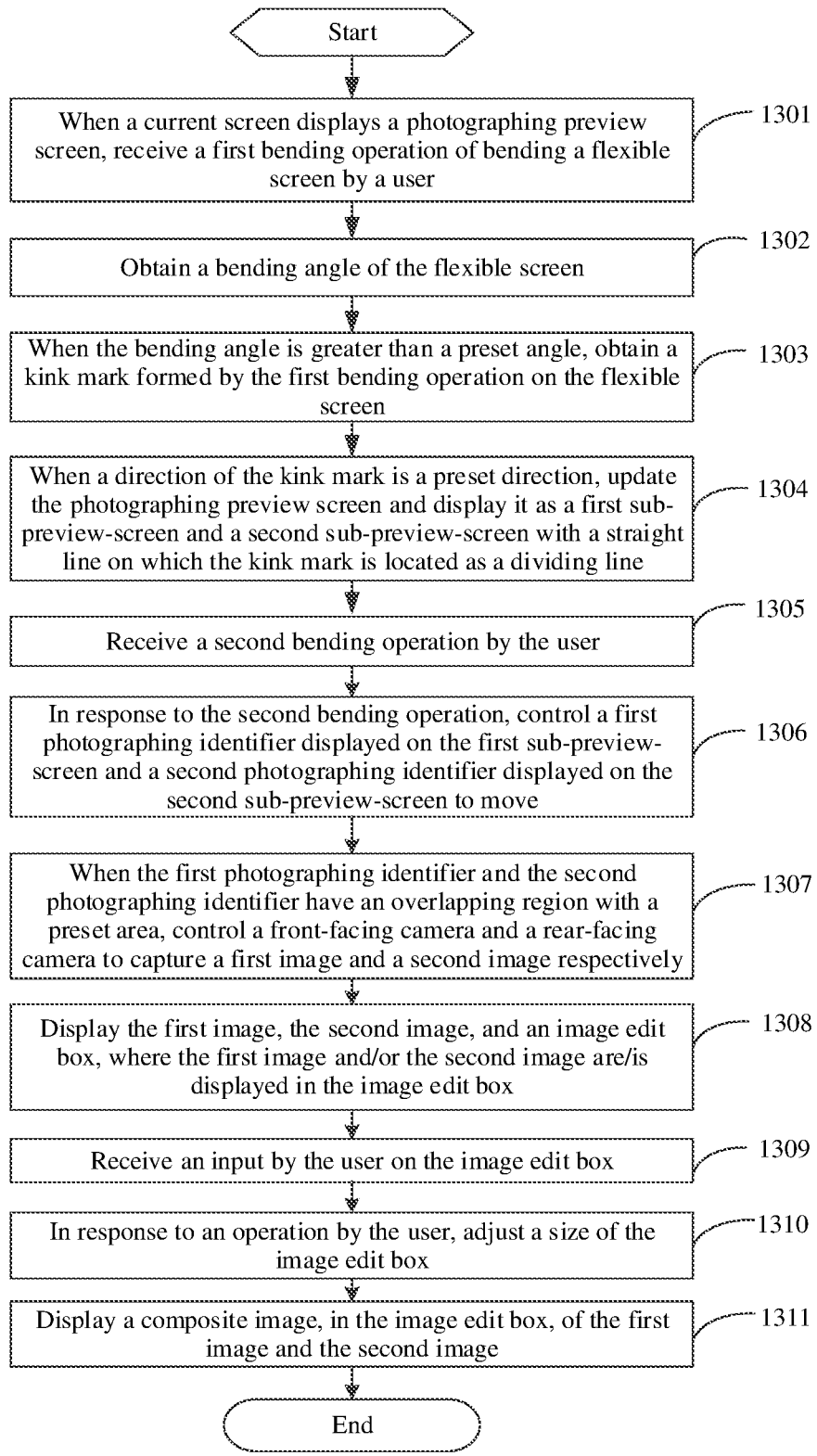
FIG. 13 is a third flowchart of a photographing method according to an embodiment of this disclosure.

When the mobile terminal is a mobile terminal with a flexible screen, as shown in FIG. 13, a photographing method includes the following steps.

Step 1301: When a current screen displays a photographing preview screen, receive a first bending operation of bending the flexible screen by a user.

Step 1302: Obtain the bending angle of the flexible screen.

Step 1303: When the bending angle is greater than a preset angle, obtain a kink mark formed by the first bending operation on the flexible screen.

Step 1304: When a direction of the kink mark is a preset direction, update the photographing preview screen and display it as a first sub-preview-screen and a second sub-preview-screen with a straight line on which the kink mark is located as a dividing line, where the first sub-preview-screen displays a preview image captured by a front-facing camera, and the second sub-preview-screen displays a preview image captured by a rear-facing camera.

Step 1305: Receive a second bending operation by the user.

Step 1306: In response to the second bending operation, control a first photographing identifier displayed on the first sub-preview-screen and a second photographing identifier displayed on the second sub-preview-screen to move.

Step 1307: When the first photographing identifier and the second photographing identifier have an overlapping region with a preset area, control the front-facing camera and the rear-facing camera to capture a first image and a second image respectively.

Step 1308: Display the first image, the second image, and an image edit box, where the first image and/or the second image are/is displayed in the image edit box.

Step 1309: Receive an input by the user on the image edit box.

Step 1310: In response to an operation by the user, adjust a size of the image edit box.

Step 1311: Display a composite image, in the image edit box, of the first image and the second image.

For specific implementations of step 1301 to step 1311, refer to the descriptions in step 101 to step 105. Details are not described herein again.

In the embodiments of this disclosure, the photographing method may be applied to a mobile terminal, for example, a mobile phone, a tablet computer (Tablet Computer), a laptop computer (Laptop Computer), a personal digital assistant (personal digital assistant, PDA), a mobile Internet device (Mobile Internet Device, MID), or a wearable device (Wearable Device).

According to the photographing method in the embodiments of this disclosure, the first input by the user is received when the current screen displays the photographing preview screen; in response to the first input, the photographing preview screen is updated and displayed as the first sub-preview-screen and the second sub-preview-screen; the second input by the user is received; in response to the second input, the first photographing identifier displayed on the first sub-preview-screen and the second photographing identifier displayed on the second sub-preview-screen are controlled to move; and when the first photographing identifier and the second photographing identifier have the overlapping region with the preset area, the front-facing camera and the rear-facing camera are controlled to capture the first image and the second image respectively, and the composite image of the first image and the second image is displayed. The first sub-preview-screen displays the preview image captured by the front-facing camera, and the second sub-preview-screen displays the preview image captured by the rear-facing camera. In this way, the mobile terminal may control the front-facing camera and the rear-facing camera to simultaneously photograph images, and when two photographing identifiers on two sub-preview-screens have an overlapping region, control the two images photographed by the front-facing camera and the rear-facing camera to be synthesized into one image. Operations in the process of generating a composite image are simple.

Figure 14:
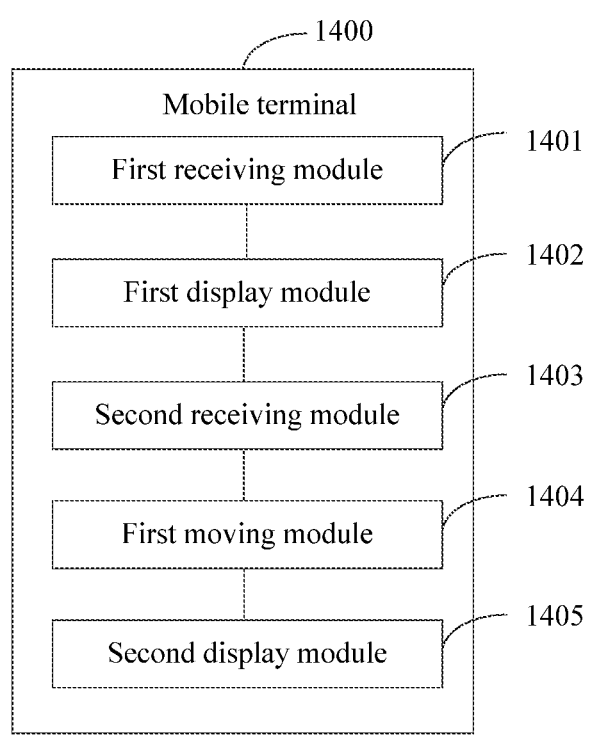
FIG. 14 is a first structural diagram of a mobile terminal according to an embodiment of this disclosure.

FIG. 14 is a structural diagram of a mobile terminal according to an embodiment of this disclosure. The mobile terminal has both a front-facing camera and a rear-facing camera. As shown in FIG. 14, the mobile terminal 1400 includes:

a first receiving module 1401, configured to receive a first input by a user when a current screen displays a photographing preview screen;

a first display module 1402, configured to: in response to the first input received by the first receiving module 1401, update the photographing preview screen and display it as a first sub-preview-screen and a second sub-preview-screen;

a second receiving module 1403, configured to receive a second input by the user;

a first moving module 1404, configured to: in response to the second input received by the second receiving module 1403, control a first photographing identifier displayed on the first sub-preview-screen and a second photographing identifier displayed on the second sub-preview-screen to move; and a second display module 1405, configured to: when the first photographing identifier and the second photographing identifier have an overlapping region with a preset area, control the front-facing camera and the rear-facing camera to capture a first image and a second image respectively, and display a composite image of the first image and the second image, where the first sub-preview-screen displays a preview image captured by the front-facing camera, and the second sub-preview-screen displays a preview image captured by the rear-facing camera.

Optionally, the first input is a sliding operation performed by the user on the photographing preview screen; and the first display module includes:

a first obtaining submodule, configured to obtain a sliding trajectory of the first input; and a first display submodule, configured to: when the sliding trajectory obtained by the first obtaining submodule satisfies a preset condition, update the photographing preview screen and display it as the first sub-preview-screen and the second sub-preview-screen with a straight line on which the sliding trajectory is located as a dividing line.

Optionally, the first display submodule includes:

an obtaining unit, configured to obtain N target points on the sliding trajectory;

a calculation unit, configured to obtain a coordinate value, of each target point obtained by the obtaining unit, in a preset coordinate system, and calculate a variance of coordinate values of the N target points; and a first display unit, configured to: when the variance is less than a preset threshold and a length of the sliding trajectory is greater than a preset length, update the photographing preview screen and display it as the first sub-preview-screen and the second sub-preview-screen with the straight line on which the sliding trajectory is located as the dividing line, where the coordinate value of each target point is a coordinate value of the target point in an X direction or a Y direction of the preset coordinate system, and N is an integer greater than 1.

Optionally, the mobile terminal further includes:

a third receiving module, configured to receive a third input that the user drags the dividing line; and a second moving module, configured to: in response to the third input received by the third receiving module, control the dividing line to move according to a dragging direction and a dragging distance of the third input.

Optionally, the mobile terminal is a mobile terminal with a flexible screen, and the first input is an operation of bending the flexible screen by the user; and the first display module includes:

a second obtaining submodule, configured to obtain a bending angle of the flexible screen;

a third obtaining submodule, configured to: when the bending angle obtained by the second obtaining submodule is greater than a preset angle, obtain a kink mark formed by the first input on the flexible screen; and a second display submodule, configured to: when a direction of the kink mark obtained by the third obtaining submodule is a preset direction, update the photographing preview screen and display it as the first sub-preview-screen and the second sub-preview-screen with a straight line on which the kink mark is located as a dividing line.

Optionally, the mobile terminal further includes:

a fourth receiving module, configured to receive a fourth input that the user bends the flexible screen; and a third moving module, configured to: in response to the fourth input received by the fourth receiving module, control the dividing line to move according to a bending direction of the fourth input, where moving of a location of the dividing line corresponds to size adjustment of screen areas of the first sub-preview-screen and the second sub-preview-screen, a first bending direction of the fourth input corresponds to a first moving direction of the dividing line, and a second bending direction of the fourth input corresponds to a second moving direction of the dividing line.

Optionally, the second display module includes:

a capture submodule, configured to: when the first photographing identifier and the second photographing identifier have the overlapping region with the preset area, control the front-facing camera and the rear-facing camera to capture the first image and the second image respectively; and a second display submodule, configured to: when the first image includes a face image, display a composite image of the face image and the second image.

Optionally, the second display submodule includes:

a second display unit, configured to: when the first image includes the face image, display the face image at a preset location on the second image;

a receiving unit, configured to receive a fifth input that the user drags the face image displayed by the second display unit;

a moving unit, configured to: in response to the fifth input received by the receiving unit, move the face image; and a third display unit, configured to display the composite image of the face image moved by the moving unit and the second image, where the face image is at a dragging end location of the fifth input.

Optionally, the mobile terminal further includes:

a third display module, configured to display a first image edit box and a second image edit box, where the first image is displayed in the first image edit box, and the second image is displayed in the second image edit box;

a fifth receiving module, configured to receive a sixth input by the user on the first image edit box or the second image edit box displayed by the third display module; and a first adjustment module, configured to: in response to the sixth input received by the fifth receiving module, adjust a size of the first image edit box or the second image edit box, where the first image edit box is used to adjust a size of the first image, and the second image edit box is used to adjust a size of the second image.

Optionally, the mobile terminal further includes:

a fourth display module, configured to display a third image edit box, where the composite image is displayed in the third image edit box;

a sixth receiving module, configured to receive a seventh input by the user on the third image edit box displayed by the fourth display module; and a second adjustment module, configured to: in response to the seventh input received by the sixth receiving module, adjust a size of the third image edit box, where the third image edit box is used to adjust a size of the composite image.

The mobile terminal 1400 can implement various processes that are implemented by the mobile terminal in the foregoing method embodiments. To avoid repetition, details are not described herein again.

According to the mobile terminal 1400 in this embodiment of this disclosure, the mobile terminal may control the front-facing camera and the rear-facing camera to simultaneously photograph images, and when two photographing identifiers on two sub-preview-screens have an overlapping region, control the two images photographed by the front-facing camera and the rear-facing camera to be synthesized into one image. An image synthesis manner is simple.

Figure 15:
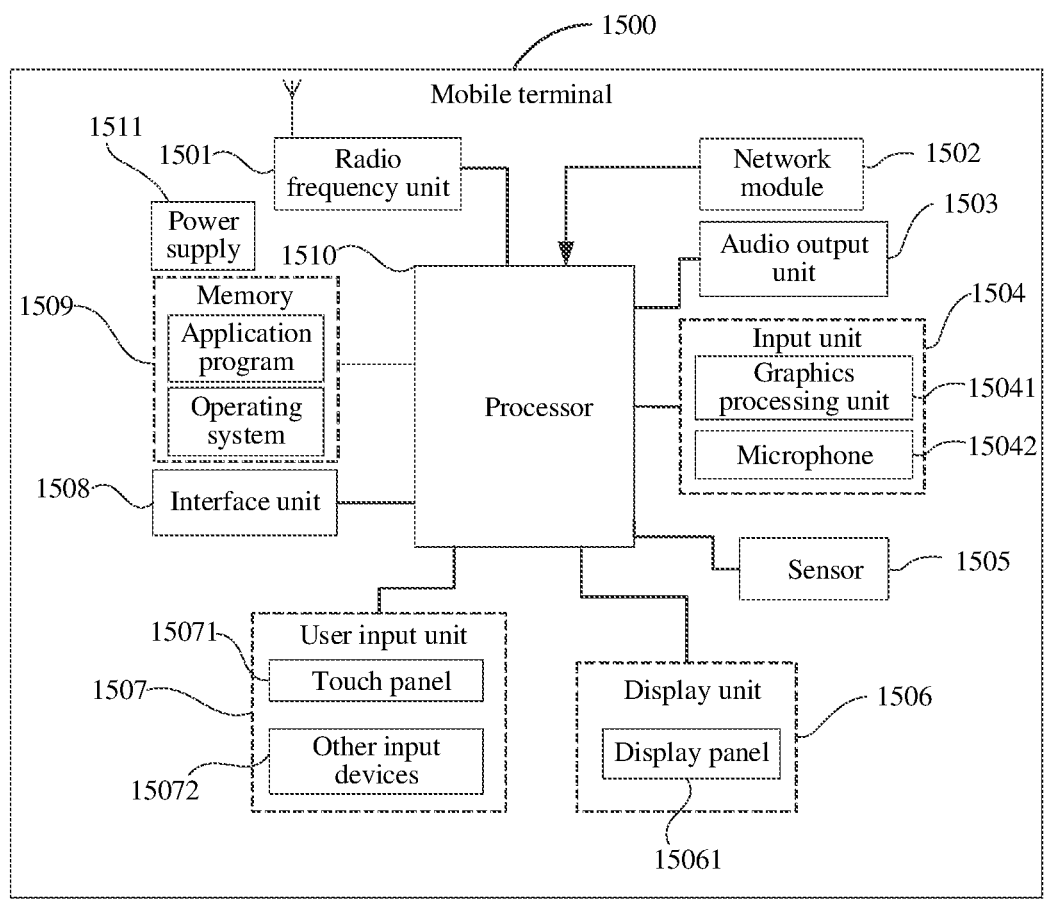
FIG. 15 is a second structural diagram of a mobile terminal according to an embodiment of this disclosure.

FIG. 15 is a schematic diagram of a hardware structure of a mobile terminal for implementing the embodiments of this disclosure. The mobile terminal has both a front-facing camera and a rear-facing camera. The mobile terminal 1500 includes but is not limited to components such as a radio frequency unit 1501, a network module 1502, an audio output unit 1503, an input unit 1504, a sensor 1505, a display unit 1506, a user input unit 1507, an interface unit 1508, a memory 1509, a processor 1510, and a power supply 1511. A person skilled in the art may understand that the mobile terminal structure shown in FIG. 15 does not constitute a limitation to the mobile terminal. The mobile terminal may include more or fewer components than those shown in the figure, or some components may be combined, or there may be a different component layout. In this embodiment of this disclosure, the mobile terminal includes but is not limited to a mobile phone, a tablet computer a notebook computer, a palmtop computer, an in-vehicle mobile terminal, a wearable device, a pedometer, and the like.

The processor 1510 is configured to: receive the first input by a user when a current screen displays a photographing preview screen; in response to the first input, update the photographing preview screen and display it as a first sub-preview-screen and a second sub-preview-screen; receive a second input by the user; in response to the second input, control a first photographing identifier displayed on the first sub-preview-screen and a second photographing identifier displayed on the second sub-preview-screen to move; and when the first photographing identifier and the second photographing identifier have an overlapping region with a preset area, control the front-facing camera and the rear-facing camera to capture a first image and a second image respectively, and display a composite image of the first image and the second image. The first sub-preview-screen displays a preview image captured by the front-facing camera, and the second sub-preview-screen displays a preview image captured by the rear-facing camera.

In this way, the mobile terminal may control the front-facing camera and the rear-facing camera to simultaneously photograph images, and when two photographing identifiers on two sub-preview-screens have an overlapping region, control the two images photographed by the front-facing camera and the rear-facing camera to be synthesized into one image. An image synthesis manner is simple.

Optionally, the first input is a sliding operation performed by the user on the photographing preview screen, and the processor 1510 is further configured to: obtain a sliding trajectory of the first input; and when the sliding trajectory satisfies a preset condition, update the photographing preview screen and display it as the first sub-preview-screen and the second sub-preview-screen with a straight line on which the sliding trajectory is located as a dividing line.

Optionally, the processor 1510 is further configured to: obtain N target points on the sliding trajectory; obtain a coordinate value of each target point in a preset coordinate system, and calculate a variance of coordinate values of the N target points; and when the variance is less than a preset threshold and a length of the sliding trajectory is greater than a preset length, update the photographing preview screen and display it as the first sub-preview-screen and the second sub-preview-screen with the straight line on which the sliding trajectory is located as the dividing line. The coordinate value of each target point is a coordinate value of the target point in an X direction or a Y direction of the preset coordinate system, and N is an integer greater than 1.

Optionally, the processor 1510 is further configured to: receive a third input that the user drags the dividing line; and in response to the third input, control the dividing line to move according to a dragging direction and a dragging distance of the third input.

Optionally, the mobile terminal is a mobile terminal with a flexible screen, the first input is an operation of bending the flexible screen by the user, and the processor 1510 is further configured to: obtain a bending angle of the flexible screen; when the bending angle is greater than a preset angle, obtain a kink mark formed by the first input on the flexible screen; and when a direction of the kink mark is a preset direction, update the photographing preview screen and display it as the first sub-preview-screen and the second sub-preview-screen whose dividing line is a straight line on which the kink mark is located as a dividing line.

Optionally, the processor 1510 is further configured to: receive a fourth input that the user bends the flexible screen; and in response to the fourth input, control the dividing line to move according to a bending direction of the fourth input, where moving of a location of the dividing line corresponds to size adjustment of screen areas of the first sub-preview-screen and the second sub-preview-screen, a first bending direction of the fourth input corresponds to a first moving direction of the dividing line, and a second bending direction of the fourth input corresponds to a second moving direction of the dividing line.

Optionally, the processor 1510 is further configured to: when the first photographing identifier and the second photographing identifier have the overlapping region with the preset area, control the front-facing camera and the rear-facing camera to capture the first image and the second image respectively, and display the composite image of the first image and the second image.

Optionally, the processor 1510 is further configured to: when the first image includes a face image, display the face image at a preset location on the second image; receive a fifth input that the user drags the face image; and display a composite image of the face image and the second image. The face image is at a dragging end location of the fifth input.

Optionally, the processor 1510 is further configured to: display a first image edit box and a second image edit box, where the first image is displayed in the first image edit box, and the second image is displayed in the second image edit box; receive a sixth input by the user on the first image edit box or the second image edit box; and in response to the sixth input, adjust a size of the first image edit box or the second image edit box, where the first image edit box is used to adjust a size of the first image, and the second image edit box is used to adjust a size of the second image.

Optionally, the processor 1510 is further configured to: display a third image edit box, where the composite image is displayed in the third image edit box; receive a seventh input by the user on the third image edit box; and in response to the seventh input, adjust a size of the third image edit box, where the third image edit box is used to adjust a size of the composite image.

It should be understood that, in this embodiment of this disclosure, the radio frequency unit 1501 may be configured to send or receive a signal in an information sending/receiving or call process. Specifically, the radio frequency unit 1501 receives downlink data from a base station and sends the downlink data to the processor 1510 for processing; and sends uplink data to the base station. Usually, the radio frequency unit 1501 includes but is not limited to an antenna, at least one amplifier, a transceiver, a coupler, a low noise amplifier, a duplexer, and the like. In addition, the radio frequency unit 1501 may further communicate with a network and another device by using a wireless communications system.

The mobile terminal provides the user with wireless broadband Internet access by using the network module 1502, for example, helps the user send or receive an email, browse a web page, access streaming media, and the like.

The audio output unit 1503 may convert audio data into an audio signal, and output the audio signal a sound, where the audio data is received by the radio frequency unit 1501 or the network module 1502, or is stored in the memory 1509. In addition, the audio output unit 1503 may further provide audio output (for example, a call signal reception tone or a message reception tone) that is related to a specific function performed by the mobile terminal 1500. The audio output unit 1503 includes a loudspeaker, a buzzer, a phone receiver, and the like.

The input unit 1504 is configured to receive an audio signal or a video signal. The input unit 1504 may include a graphics processing unit (Graphics Processing Unit, GPU) 15041 and a microphone 15042. The graphics processing unit 15041 processes image data of a static picture or a video that is obtained by an image capture apparatus (for example, a camera) in a video capture mode or an image capture mode. A processed image frame may be displayed on the display unit 1506. An image frame processed by the graphics processing unit 15041 may be stored in the memory 1509 (or another storage medium), or may be sent by the radio frequency unit 1501 or the network module 1502. The microphone 15042 may receive a sound, and can process the sound into audio data. In a phone call mode, processed audio data may be converted, for output, into a format for transmission by the radio frequency unit 1501 to a mobile communications base station.

The mobile terminal 1500 further includes at least one sensor 1505, for example, an optical sensor, a motion sensor, and another sensor. Specifically, the optical sensor includes an ambient light sensor and a proximity sensor. The ambient light sensor may adjust brightness of a display panel 15061 according to intensity of ambient light. When the mobile terminal 1500 moves near an ear, the proximity sensor may disable the display panel 15061 and/or backlight. As a motion sensor, an accelerometer sensor may detect for a value of an acceleration in various directions (there are usually three axes), may detect for a value and a direction of gravity when the mobile terminal is still, and may be configured to recognize a posture of the mobile terminal (for example, landscape/portrait mode switching, a related game, or magnetometer posture calibration), provide a function related to vibration recognition (for example, a pedometer or a keystroke), or the like. The sensor 1505 may further include a fingerprint sensor, a pressure sensor, an iris sensor, a molecular sensor, a gyroscope, a barometer, a hygrometer, a thermometer, or an infrared sensor. Details are not described herein.

The display unit 1506 is configured to display information entered by the user or information provided for the user. The display unit 1506 may include the display panel 15061. Optionally, the display panel 15061 may be configured in a form of a liquid crystal display (Liquid Crystal, LCD), an organic light-emitting diode (Organic Light-Emitting Diode, OLED), or the like.

The user input unit 1507 may be configured to receive entered numerical or character information, and generate key signal input that is related to a user setting and function control of the mobile terminal. Specifically, the user input unit 1507 includes a touch panel 15071 and other input devices 15072. The touch panel 15071 is also referred to as a touchscreen, and may collect a touch operation by the user on or near the touch panel (for example, an operation performed on or near the touch panel 15071 by the user by using any appropriate object or accessory such as a finger or a stylus). The touch panel 15071 may include two parts: a touch detection apparatus and a touch controller. The touch detection apparatus detects for a touch orientation by the user, detects for a signal brought by the touch operation, and transmits the signal to the touch controller. The touch controller receives touch information from the touch detection apparatus, converts the touch information into contact coordinates, sends the contact coordinates to the processor 1510, receives a command sent by the processor 1510, and executes the command In addition, the touch panel 15071 may be implemented in a plurality of types, for example, a resistive type, a capacitive type, an infrared type, and a surface acoustic wave. In addition to the touch panel 15071, the user input unit 1507 may further include the other input devices 15072. Specifically, the other input devices 15072 may include but are not limited to a physical keyboard, a function key (for example, a volume control key or a power on/off key), a track ball, a mouse, and a joystick. Details are not described herein.

Further, the touch panel 15071 may cover the display panel 15061. After detecting a touch operation on or near the touch panel 15071, the touch panel 15071 transmits the touch operation to the processor 1510 to determine a type of a touch event. Then the processor 1510 provides corresponding visual output on the display panel 15061 according to the type of the touch event. In FIG. 15, the touch panel 15071 and the display panel 15061 serve as two independent components to implement input and output functions of the mobile terminal. However, in some embodiments, the touch panel 15071 and the display panel 15061 may be integrated to implement the input and output functions of the mobile terminal. This is not specifically limited herein.

The interface unit 1508 is an interface for connecting an external apparatus to the mobile terminal 1500. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, or a headset port. The interface unit 1508 may be configured to receive input (for example, data information and electric power) from the external apparatus, and transmit the received input to one or more elements in the mobile terminal 1500; or may be configured to transmit data between the mobile terminal 1500 and the external apparatus.

The memory 1509 may be configured to store software programs and various types of data. The memory 1509 may mainly include a program storage region and a data storage region. The program storage region may store an operating system, an application program required by at least one function (for example, an audio play function or an image play function), and the like. The data storage region may store data (for example, audio data and a phone book) created according to usage of the mobile terminal. In addition, the memory 1509 may include a high-speed random access memory, or may include a nonvolatile memory, for example, at least one magnetic disk storage device or a flash memory device, or another volatile solid-state storage device.

The processor 1510 is a control center of the mobile terminal, connects various parts of the entire mobile terminal by using various interfaces and lines, and executes various functions and data processing of the mobile terminal by running or executing a software program and/or a module stored in the memory 1509 and invoking data stored in the memory 1509, so as to perform overall monitoring on the mobile terminal. The processor 1510 may include one or more processing units. Optionally, the processor 1510 may integrate an application processor and a modem processor. The application processor mainly processes an operating system, a user interface, an application program, and the like. The modem processor mainly processes wireless communication. It may be understood that the modem processor may be alternatively not integrated in the processor 1510.

The mobile terminal 1500 may further include a power supply 1511 (for example, a battery) that supplies power to each component. Optionally, the power supply 1511 may be logically connected to the processor 1510 by using a power management system, so as to implement functions such as charge management, discharge management, and power consumption management by using the power management system.

In addition, the mobile terminal 1500 may include some functional modules that are not shown. Details are not described herein.

Optionally, an embodiment of this disclosure further provides a mobile terminal, including: a processor 1510, a memory 1509, and a computer program that is stored in the memory 1509 and is capable of running on the processor 1510. When the computer program is executed by the processor 1510, processes in the foregoing embodiments of the photographing method are implemented, and a same technical effect can be achieved. To avoid repetition, details are not described herein again.

An embodiment of this disclosure further provides a computer-readable storage medium. The computer-readable storage medium stores a computer program, and when the computer program is executed by a processor, processes in the foregoing embodiments of the photographing method are implemented, and a same technical effect can be achieved. To avoid repetition, details are not described herein again. For example, the computer-readable storage medium is a read-only memory (Read-Only Memory, ROM for short), a random access memory (Random Access Memory, RAM for short), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing descriptions of the implementations, a person skilled in the art may clearly understand that the method in the foregoing embodiments may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this disclosure essentially, or a part contributing to the prior art may be implemented in a form of a software product. The computer software product is stored in a storage medium (for example, a ROM/RAM, a magnetic disk, or an optical disc), and includes several instructions for instructing a mobile terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely examples, and do not constitute a limitation. Inspired by this disclosure, a person of ordinary skill in the art can make many variations without departing from the essence of this disclosure or the protection scope of the claims. All these variations shall fall within the protection scope of this disclosure.

What is claimed is:

1. A photographing method, wherein the photographing method is applied to a mobile terminal that comprises a front-facing camera and a rear-facing camera, and the photographing method comprises:
   receiving a first input by a user when a current screen displays a photographing preview screen;
   in response to the first input, updating the photographing preview screen and displaying it as a first sub-preview-screen and a second sub-preview-screen;
   receiving a second input by the user;
   in response to the second input, controlling a first photographing identifier displayed on the first sub-preview-screen and a second photographing identifier displayed on the second sub-preview-screen to move; and
   when the first photographing identifier and the second photographing identifier have an overlapping region with a preset area, controlling the front-facing camera and the rear-facing camera to capture a first image and a second image respectively, and displaying a composite image of the first image and the second image, wherein the first sub-preview-screen displays a preview image captured by the front-facing camera, and the second sub-preview-screen displays a preview image captured by the rear-facing camera.

2. The method according to claim 1, wherein the first input is a sliding operation performed by the user on the photographing preview screen; and the updating the photographing preview screen and displaying it as a first sub-preview-screen and a second sub-preview-screen comprises:

obtaining a sliding trajectory of the first input; and when the sliding trajectory satisfies a preset condition, updating the photographing preview screen and displaying it as the first sub-preview-screen and the second sub-preview-screen with a straight line on which the sliding trajectory is located as a dividing line.

3. The method according to claim 2, wherein the when the sliding trajectory satisfies a preset condition, updating the photographing preview screen and displaying it as the first sub-preview-screen and the second sub-preview-screen with a straight line on which the sliding trajectory is located as a dividing line comprises:

obtaining N target points on the sliding trajectory;

obtaining a coordinate value of each target point in a preset coordinate system, and calculating a variance of coordinate values of the N target points; and when the variance is less than a preset threshold and a length of the sliding trajectory is greater than a preset length, updating the photographing preview screen and displaying it as the first sub-preview-screen and the second sub-preview-screen with the straight line on which the sliding trajectory is located as the dividing line, wherein the coordinate value of each target point is a coordinate value of the target point in an X direction or a Y direction of the preset coordinate system, and N is an integer greater than 1.

4. The method according to claim 2, wherein after the when the sliding trajectory satisfies a preset condition, updating the photographing preview screen and displaying it as the first sub-preview-screen and the second sub-preview-screen with a straight line on which the sliding trajectory is located as a dividing line, and before the receiving a second input by the user, the method further comprises:

receiving a third input that the user drags the dividing line; and in response to the third input, controlling the dividing line to move according to a dragging direction and a dragging distance of the third input.

5. The method according to claim 1, wherein the mobile terminal is a mobile terminal with a flexible screen, and the first input is an operation of bending the flexible screen by the user; and the updating the photographing preview screen and displaying it as a first sub-preview-screen and a second sub-preview-screen comprises:

obtaining a bending angle of the flexible screen;

when the bending angle is greater than a preset angle, obtaining a kink mark formed by the first input on the flexible screen; and when a direction of the kink mark is a preset direction, updating the photographing preview screen and displaying it as the first sub-preview-screen and the second sub-preview-screen with a straight line on which the kink mark is located as a dividing line.

6. The method according to claim 5, wherein after the when a direction of the kink mark is a preset direction, updating the photographing preview screen and displaying it as the first sub-preview-screen and the second sub-preview-screen with a straight line on which the kink mark is located as a dividing line, the method further comprises:

receiving a fourth input that the user bends the flexible screen; and in response to the fourth input, controlling the dividing line to move according to a bending direction of the fourth input, wherein moving of a location of the dividing line corresponds to size adjustment of screen areas of the first sub-preview-screen and the second sub-preview-screen, a first bending direction of the fourth input corresponds to a first moving direction of the dividing line, and a second bending direction of the fourth input corresponds to a second moving direction of the dividing line.

7. The method according to claim 1, wherein the when the first photographing identifier and the second photographing identifier have an overlapping region with a preset area, controlling the front-facing camera and the rear-facing camera to capture a first image and a second image respectively, and displaying a composite image of the first image and the second image comprises:

when the first photographing identifier and the second photographing identifier have the overlapping region with the preset area, controlling the front-facing camera and the rear-facing camera to capture the first image and the second image respectively; and when the first image comprises a face image, displaying a composite image of the face image and the second image.

8. The method according to claim 7, wherein the when the first image comprises a face image, displaying a composite image of the face image and the second image comprises:

when the first image comprises the face image, displaying the face image at a preset location on the second image;

receiving a fifth input that the user drags the face image;

in response to the fifth input, moving the face image; and displaying the composite image of the face image and the second image, wherein the face image is at a dragging end location of the fifth input.

9. The method according to claim 1, wherein before the displaying a composite image of the first image and the second image, the method further comprises:

displaying a first image edit box and a second image edit box, wherein the first image is displayed in the first image edit box, and the second image is displayed in the second image edit box;

receiving a sixth input by the user on the first image edit box or the second image edit box; and in response to the sixth input, adjusting a size of the first image edit box or the second image edit box, wherein the first image edit box is used to adjust a size of the first image, and the second image edit box is used to adjust a size of the second image.

10. The method according to claim 1, wherein after the displaying a composite image of the first image and the second image, the method further comprises:

displaying a third image edit box, wherein the composite image is displayed in the third image edit box;

receiving a seventh input by the user on the third image edit box; and in response to the seventh input, adjusting a size of the third image edit box, wherein the third image edit box is used to adjust a size of the composite image.

11. A mobile terminal, wherein the mobile terminal has a front-facing camera and a rear-facing camera, and the mobile terminal comprises a memory, a processor, and a program that is stored in the memory and is capable of running on the processor, when the program is executed by the processor, the processor implements steps of a photographing method, the photographing method comprising:

receiving a first input by a user when a current screen displays a photographing preview screen;

in response to the first input, updating the photographing preview screen and displaying it as a first sub-preview-screen and a second sub-preview-screen;

receiving a second input by the user;

in response to the second input, controlling a first photographing identifier displayed on the first sub-preview-screen and a second photographing identifier displayed on the second sub-preview-screen to move; and when the first photographing identifier and the second photographing identifier have an overlapping region with a preset area, controlling the front-facing camera and the rear-facing camera to capture a first image and a second image respectively, and displaying a composite image of the first image and the second image, wherein the first sub-preview-screen displays a preview image captured by the front-facing camera, and the second sub-preview-screen displays a preview image captured by the rear-facing camera.

12. The mobile terminal according to claim 11, wherein the first input is a sliding operation performed by the user on the photographing preview screen; and the updating the photographing preview screen and displaying it as a first sub-preview-screen and a second sub-preview-screen comprises:

obtaining a sliding trajectory of the first input; and when the sliding trajectory satisfies a preset condition, updating the photographing preview screen and displaying it as the first sub-preview-screen and the second sub-preview-screen with a straight line on which the sliding trajectory is located as a dividing line.

13. The mobile terminal according to claim 12, wherein the when the sliding trajectory satisfies a preset condition, updating the photographing preview screen and displaying it as the first sub-preview-screen and the second sub-preview-screen with a straight line on which the sliding trajectory is located as a dividing line comprises:

obtaining N target points on the sliding trajectory;

obtaining a coordinate value of each target point in a preset coordinate system, and calculating a variance of coordinate values of the N target points; and when the variance is less than a preset threshold and a length of the sliding trajectory is greater than a preset length, updating the photographing preview screen and displaying it as the first sub-preview-screen and the second sub-preview-screen with the straight line on which the sliding trajectory is located as the dividing line, wherein the coordinate value of each target point is a coordinate value of the target point in an X direction or a Y direction of the preset coordinate system, and N is an integer greater than 1.

14. The mobile terminal according to claim 12, wherein after the when the sliding trajectory satisfies a preset condition, updating the photographing preview screen and displaying it as the first sub-preview-screen and the second sub-preview-screen with a straight line on which the sliding trajectory is located as a dividing line, and before the receiving a second input by the user, the photographing method further comprises:

receiving a third input that the user drags the dividing line; and in response to the third input, controlling the dividing line to move according to a dragging direction and a dragging distance of the third input.

15. The mobile terminal according to claim 11, wherein the mobile terminal is a mobile terminal with a flexible screen, and the first input is an operation of bending the flexible screen by the user; and the updating the photographing preview screen and displaying it as a first sub-preview-screen and a second sub-preview-screen comprises:

obtaining a bending angle of the flexible screen;

when the bending angle is greater than a preset angle, obtaining a kink mark formed by the first input on the flexible screen; and when a direction of the kink mark is a preset direction, updating the photographing preview screen and displaying it as the first sub-preview-screen and the second sub-preview-screen with a straight line on which the kink mark is located as a dividing line.

16. The mobile terminal according to claim 15, wherein after the when a direction of the kink mark is a preset direction, updating the photographing preview screen and displaying it as the first sub-preview-screen and the second sub-preview-screen with a straight line on which the kink mark is located as a dividing line, the photographing method further comprises:

receiving a fourth input that the user bends the flexible screen; and in response to the fourth input, controlling the dividing line to move according to a bending direction of the fourth input, wherein moving of a location of the dividing line corresponds to size adjustment of screen areas of the first sub-preview-screen and the second sub-preview-screen, a first bending direction of the fourth input corresponds to a first moving direction of the dividing line, and a second bending direction of the fourth input corresponds to a second moving direction of the dividing line.

17. The mobile terminal according to claim 11, wherein the when the first photographing identifier and the second photographing identifier have an overlapping region with a preset area, controlling the front-facing camera and the rear-facing camera to capture a first image and a second image respectively, and displaying a composite image of the first image and the second image comprises:

when the first photographing identifier and the second photographing identifier have the overlapping region with the preset area, controlling the front-facing camera and the rear-facing camera to capture the first image and the second image respectively; and when the first image comprises a face image, displaying a composite image of the face image and the second image.

18. The mobile terminal according to claim 17, wherein the when the first image comprises a face image, displaying a composite image of the face image and the second image comprises:

when the first image comprises the face image, displaying the face image at a preset location on the second image;

receiving a fifth input that the user drags the face image;
in response to the fifth input, moving the face image; and
displaying the composite image of the face image and the second image, wherein
the face image is at a dragging end location of the fifth input.

19. The mobile terminal according to claim 11, wherein:
before the displaying a composite image of the first image and the second image, the photographing method further comprises:
displaying a first image edit box and a second image edit box, wherein the first image is displayed in the first image edit box, and the second image is displayed in the second image edit box;
receiving a sixth input by the user on the first image edit box or the second image edit box; and
in response to the sixth input, adjusting a size of the first image edit box or the second image edit box, wherein the first image edit box is used to adjust a size of the first image, and the second image edit box is used to adjust a size of the second image; or,
after the displaying a composite image of the first image and the second image, the photographing method further comprises:
displaying a third image edit box, wherein the composite image is displayed in the third image edit box;
receiving a seventh input by the user on the third image edit box; and
in response to the seventh input, adjusting a size of the third image edit box, wherein the third image edit box is used to adjust a size of the composite image.

20. A computer-readable storage medium, wherein the computer-readable storage medium stores a program, and when the program is executed by a processor, the steps of the photographing method according to claim 1 are implemented.

* * * * *